United States Patent
Kim et al.

(10) Patent No.: US 9,020,517 B2
(45) Date of Patent: *Apr. 28, 2015

(54) METHOD AND APPARATUS FOR ALLOCATING AND ACQUIRING ACK/NACK RESOURCES IN A MOBILE COMMUNICATION SYSTEM

(71) Applicant: Samsung Electronics Co., Ltd., Gyeonggi-do (KR)

(72) Inventors: Young-Bum Kim, Seoul (KR); Joon-Young Cho, Gyeonggi-do (KR); Aris Papasakellariou, Dallas, TX (US); Hwan-Joon Kwon, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 200 days.

This patent is subject to a terminal disclaimer.

(21) Appl. No.: 13/709,900

(22) Filed: Dec. 10, 2012

(65) Prior Publication Data
US 2013/0100904 A1   Apr. 25, 2013

Related U.S. Application Data

(63) Continuation of application No. 12/139,713, filed on Jun. 16, 2008, now Pat. No. 8,331,947.

(30) Foreign Application Priority Data

Jun. 15, 2007 (KR) .................. 10-2007-0059171
Jun. 18, 2007 (KR) .................. 10-2007-0059562
Sep. 6, 2007 (KR) .................. 10-2007-0090687

(51) Int. Cl.
*H04W 72/00* (2009.01)
*H04W 72/04* (2009.01)

(Continued)

(52) U.S. Cl.
CPC ........... *H04W 72/042* (2013.01); *H04L 1/1607* (2013.01); *H04L 1/1854* (2013.01);
(Continued)

(58) Field of Classification Search
None
See application file for complete search history.

(56) References Cited

U.S. PATENT DOCUMENTS

| | | | |
|---|---|---|---|
| 7,047,473 B2 | 5/2006 | Hwang et al. | |
| 8,331,947 B2* | 12/2012 | Kim et al. | 455/450 |
| 2008/0205348 A1 | 8/2008 | Malladi | |

FOREIGN PATENT DOCUMENTS

| | | |
|---|---|---|
| KR | 1020050057926 | 6/2005 |
| KR | 1020060097695 | 9/2006 |
| WO | WO 2007045101 | 4/2007 |

OTHER PUBLICATIONS

LG Electronics, "Allocation of UL ACK/NACK Index", R1-072348 3GPP TSG RAN WG1#49, May 7, 2007.

(Continued)

*Primary Examiner* — Philip Sobutka
(74) *Attorney, Agent, or Firm* — The Farrell Law Firm, P.C.

(57) ABSTRACT

A method and apparatus are provided for receiving ACK/NACK information by a base station. The method includes transmitting data and control information to at least one UE, the control information being transmitted through a downlink control channel including at least one CCE; checking a resource for reception of an ACK/NACK mapped to the at least one CCE based on a mapping rule between CCEs and resources for reception of the ACK/NACK, the resource for reception of the ACK/NACK identified by a cyclic shift index, an orthogonal sequence index, and a resource block index; and receiving the ACK/NACK information for the transmitted data using the checked resource.

12 Claims, 17 Drawing Sheets

(51) Int. Cl.
*H04L 1/16* (2006.01)
*H04L 1/18* (2006.01)
*H04L 5/00* (2006.01)
*H04L 1/00* (2006.01)
*H04W 28/04* (2009.01)
*H04W 28/06* (2009.01)

(52) U.S. Cl.
CPC ............ H04L5/0005 (2013.01); H04L 5/0053 (2013.01); *H04L 1/0026* (2013.01); *H04L 5/0023* (2013.01); *H04L 5/0091* (2013.01); *H04W 28/04* (2013.01); *H04W 28/06* (2013.01); *H04W 72/0413* (2013.01)

(56) References Cited

OTHER PUBLICATIONS

NTT DoCoMo, Fujitsu, Mitsubishi Electric, "Implicit Resource Allocation of ACK/NACK Signal in E-UTRA Uplink", R1-072439, 3GPP TSG RAN WG1 Meeting #49, May 7, 2007.

* cited by examiner

METHOD AND APPARATUS FOR ALLOCATING AND ACQUIRING ACK/NACK RESOURCES IN A MOBILE COMMUNICATION SYSTEM

PRIORITY

This application is a Continuation of U.S. Ser. No. 12/139,713, which was filed in the U.S. Patent and Trademark Office on Jun. 16, 2008, and claims priority under 35 U.S.C. §119(a) to Korean Patent Application Serial No. 2007-59171, which was filed in the Korean Intellectual Property Office (KIPO) on Jun. 15, 2007, Korean Patent Application Serial No. 2007-59562, which was filed in KIPO on Jun. 18, 2007, and Korean Patent Application Serial No. 2007-90687, which was filed in KIPO on Sep. 6, 2007, the disclosures of which are incorporated herein by reference.

BACKGROUND OF THE INVENTION

1. Field of the Invention

The present invention relates generally to a mobile communication system, and in particular, to a method and apparatus for efficiently using resources for control information transmission.

2. Description of the Related Art

In communication systems, for example, LTE (Long Term Evolution) system, Acknowledgement (ACK)/Negative ACK (HACK) feedback information, a type of uplink control information, which is a signal used for indicating success/failure in receiving downlink transmission data to which Hybrid Automatic Repeat reQuest (HARQ) is applied.

In the LTE system, a transmission format for uplink control information is classified according to the presence/absence of uplink transmission data. When simultaneously transmitting data and control information over the uplink, the LTE system Time Division Multiplexing (TDM)-multiplexes the data and control information, and maps the data and control information to time-frequency resources allocated for data transmission before transmission. However, when transmitting only the control information without data transmission, the LTE system uses an allocated particular frequency band(s) for control information transmission. Currently, in the standard conferences, Physical Uplink Control Channel (PUCCH) is being defined as a physical channel for transmitting only control information, and the PUCCH is map to the allocated particular frequency band.

FIG. 1 is a diagram illustrating a transmission structure of a physical channel PUCCH for control information transmission over the uplink in a 3GPP LTE system. In FIG. 1, the horizontal axis represents a time domain, and the vertical axis represents a frequency domain. More specifically, FIG. 1 illustrates the time domain in one subframe 102, and the frequency domain in a system transmission bandwidth 110.

Referring to FIG. 1, the subframe 102, which is a basic transmission unit of the uplink, has a length of 1 ms, and one subframe includes two slots 104 and 106, each having a 0.5-ms length. Each slot 104 and 106 includes multiple SC-FDMA symbols 111-123 (131-143). FIG. 1 illustrates an example where one slot includes 7 SC-FDMA symbols.

In the time-frequency domain, a basic unit of resources is a Resource Element (RE). The RE can be defined by a SC-FDMA symbol index (OFDM symbol index, for downlink) and a subcarrier index. A basic unit of resource allocation is a Resource Block (RB), such as RBs 108 and 109. The RBs 108 and 109 include multiple subcarriers and multiple SC-FDMA symbols. In the example illustrated in FIG. 1, 12 subcarriers and 14 SC-FDMA symbols constituting 2 slots constitute one RB.

Referring to FIG. 1, a frequency band to which the PUCCH is mapped, corresponds to reference numeral 108 or reference numeral 109 representing an RB corresponding to one of both ends of the system transmission band 110. The PUCCH can apply frequency hopping to increase frequency diversity during one subframe, and in this case, slot-by-slot hopping is possible. A base station (or a Node B) can allocate multiple RBs for transmission of the PUCCH to approve transmission of control information from multiple users.

Referring to FIG. 1, control information #1, which was transmitted over the pre-allocated frequency band 108 in the first slot 104, is transmitted over another pre-allocated frequency band 109 in the second slot 106, after undergoing frequency hopping. However, control information #2, which was transmitted over the pre-allocated frequency band 109 in the first slot 104, is transmitted over another pre-allocated frequency band 108 in the second slot 106 after undergoing frequency hopping.

In the example illustrated in FIG. 1, in subframe 102, control information is transmitted in SC-FDMA symbols represented by reference numerals 111, 112, 116, 117, 138, 139, 143, and 144, or reference numerals 131, 132, 136, 137, 118, 119, 123, and 124, and pilots (or Reference Signals (RSs)) are transmitted in SC-FDMA symbols represented by reference numerals 113, 114, 115, 140, 141, and 142, or reference numerals 133, 134, 135, 120, 121, and 122. The pilot, which includes a predetermined sequence, is used for channel estimation for coherent demodulation at a reception side. The number of SC-FDMA symbols for control information transmission, the number of SC-FDMA symbols for RS transmission, and their positions in the subframe are all given herein by way of example, and these are subject to change according to the type of desired transmission control information and/or system operation.

Normally, Code Division Multiplexing (CDM) is used to multiplex ACK/NACK transmitted over a PUCCH for different users in the same RB. As described above, the base station can allocate multiple RBs for transmission of the PUCCH to approve transmission of the ACK/NACK from multiple users.

A Zadoff-Chu (ZC) sequence is under discussion as a sequence to be used for CDM of the control information. The Zadoff-Chu sequence, as it has a constant signal level (or a constant envelop) in the time and frequency domains, has a good Peak-to-Average Power Ratio (PAPR) characteristic and shows excellent channel estimation performance in the frequency domain.

Generally, a length of the Zadoff-Chu sequence used for the PUCCH is assumed to be 12 samples, the number of which is equal to the number of subcarriers included in an RB. In this case, because the maximum possible number of different cyclic shift values of the Zadoff-Chu sequence is 12, it is possible to multiplex a maximum of 12 PUCCHs to one RB by allocating different cyclic shift values to the PUCCHs.

FIG. 2 illustrates an example of multiplexing an ACK/NACK of each user in the same RB with different cyclic shift values of the Zadoff-Chu sequence in transmitting the ACK/NACK over a PUCCH having the above-described structure. In FIG. 2, the vertical axis represents cyclic shift values 200 of a Zadoff-Chu sequence. In the Typical Urban (TU) model considered as a wireless channel model, because the maximum possible number of channels that can undergo multiplexing in one RB without abrupt loss of orthogonality is 6, FIG. 2 illustrates a case where 6 ACK/NACK signals 202, 204, 206, 208, 210, and 212 undergo multiplexing. FIG. 2 illustrates an example of using the same RB and the same Zadoff-Chu sequence for transmission of the ACK/NACK in such a manner that ACK/NACK 202 from UE #1 is transmitted using a cyclic shift '0' 214; ACK/NACK 204 from UE #2 is transmitted using a cyclic shift '2' 218; ACK/NACK 206 from UE #3 is transmitted using a cyclic shift '4' 222; ACK/NACK 208 from UE #4 is transmitted using a cyclic shift '6' 226; ACK/NACK 210 from UE #5 is transmitted using a cyclic shift '8' 230; and ACK/NACK 212 from UE #6 is transmitted using a cyclic shift '10' 234.

It is possible to increase multiplexing capacity of the PUCCHs carrying control information by additionally applying time-domain orthogonal sequences in addition to the CDM control information transmission based on the Zadoff-Chu sequence.

A typical example of the orthogonal sequence includes a Walsh sequence. For length-M orthogonal sequences, there are M sequences satisfying orthogonality therebetween. More specifically, for 1-bit control information, such as ACK/NACK, its multiplexing capacity can be increased by applying time-domain orthogonal sequences to SC-FDMA symbols to which ACK/NACK is mapped before transmission. An orthogonality loss caused by a change in wireless channels can be minimized by restricting a time interval in which the time-domain orthogonal sequences are applied, to one slot or less. For example, length-4 orthogonal sequences are applied for 4 SC-FDMA symbols for ACK/NACK transmission in the one slot, and length-3 orthogonal sequences are applied for 3 SC-FDMA symbols for RS transmission in the one slot. Basically, for the ACK/NACK and RS, user identification is possible with the cyclic shift values of the Zadoff-Chu sequence, and additional user identification is available by the orthogonal sequences. For coherent reception of ACK/NACK, because an RS(s) is required, which is mapped to ACK/NACK on a one-to-one basis, multiplexing capacity of the ACK/NACK signals is restricted by the RS mapped to the ACK/NACK.

FIG. 3 illustrates an example of multiplexing an ACK/NACK of each user in a same RB with time-domain orthogonal sequences in addition to the different cyclic shift values of the Zadoff-Chu sequence in the PUCCH structure for ACK/NACK transmission. In FIG. 3, the vertical axis represents cyclic shift values 300 of a Zadoff-Chu sequence, and the horizontal axis represents time-domain orthogonal sequences 302. In the TU model considered as a wireless channel model, the maximum number of cyclic shift values with which their multiplexing is possible in one RB, without abrupt loss of orthogonality, is 6, and if 3 length-4 orthogonal sequences 364, 366, and 368 are additionally used, a maximum of 6*3=18 ACK/NACK signals 304, 306, 308, 310, 312, 314, 316, 318, 320, 322, 324, 326, 328, 330, 332, 334, 336, and 338 can be multiplexed.

FIG. 3 illustrates an example of using a same RB and a same Zadoff-Chu sequence for ACK/NACK transmission in such a manner that ACK/NACK 304 from UE #1 is transmitted using a cyclic shift '0' 340 and an orthogonal sequence '0' 364; ACK/NACK 306 from UE #2 is transmitted using a cyclic shift '0' 340 and an orthogonal sequence '1' 366; ACK/NACK 308 from UE #3 is transmitted using a cyclic shift '0' 340 and an orthogonal sequence '2' 368; through; ACK/NACK 334 from UE #16 is transmitted using a cyclic shift '10' 360 and an orthogonal sequence '0' 364; ACK/NACK 336 from UE #17 is transmitted using a cyclic shift '10' 360 and an orthogonal sequence '1' 366; and ACK/NACK 338 from UE #18 is transmitted using a cyclic shift '10' 360 and an orthogonal sequence '2' 368. The orthogonal sequences 364, 366, and 368, which are length-4 orthogonal codes, satisfy orthogonality therebetween.

The resource information needed in transmitting an ACK/NACK over a PUCCH includes (i) RB information indicating through which RB the ACK/NACK is transmitted, (ii) cyclic shift information of the Zadoff-Chu sequence, and (iii) orthogonal sequence information.

The present invention provides a method for efficiently using resources and improving reception performance by defining the detailed mapping relation between control channels transmitted by the base station and resources for ACK/NACK transmission in enabling the base station and the UE to recognize, in common, the resource information for the UE ACK/NACK transmission.

A basic unit constituting a downlink control channel is a Control Channel Element (CCE). One downlink control channel includes one or multiple CCEs, each of which includes multiple REs. An increase in the number of CCEs of the downlink control channel can reduce a channel coding rate applied to control information mapped to the downlink control channel, making it possible to obtain channel coding gain.

FIG. 4 illustrates an example where a downlink control channel is generated. More specifically, FIG. 4 illustrates an example in which for a total of $N_{CCE}$ CCE 401-409, a downlink control channel 430 for UE #1 is generated with 4 CCEs of CCE#0 401-CCE#3 404; a downlink control channel 422 for UE #2 is generated with 2 CCEs of CCE#4 405 and CCE#5 406; a downlink control channel 416 for UE #3 is generated with 1 CCE of CCE#6 407; a downlink control channel 417 for UE #4 is generated with 1 CCE of CCE#7 408; and a downlink control channel 418 for UE #5 is generated with 1 CCE of CCE#$N_{CCE}$-1 409. That is, the base station transmits the downlink control information for UE #1-UE #5 in an arbitrary subframe. When multiple CCEs are included in one downlink control channel, the CCEs can be consecutive as illustrated in FIG. 4, or can be scattered, i.e., non-consecutive. The positioning of the CCEs depends on the system operation.

The UE performs decoding on the downlink control channels that can be generated with the total of $N_{CCE}$ CCEs, and upon detecting its own Identifier (ID), identifies that the corresponding channel is a downlink control channel transmitted to the UE itself.

SUMMARY OF THE INVENTION

The present invention has been designed to address at least the problems and/or disadvantages above, and to provide at least the advantages described below.

Accordingly, an aspect of the present invention is to provide an ACK/NACK resource allocation and acquisition method and apparatus for minimizing overhead required for signaling resource information for ACK/NACK transmission to a UE in a mobile communication system supporting a packet data service to which HARQ is applied.

Another aspect of the present invention is to provide an ACK/NACK resource allocation and acquisition method and apparatus for optimizing an amount of resources required for ACK/NACK transmission and improving ACK/NACK reception performance.

In accordance with an aspect of the present invention, a method is provided for receiving ACK/NACK information by a base station in a mobile communication system. The method includes transmitting data and control information to at least one UE, the control information being transmitted through a downlink control channel including at least one CCE; checking a resource for reception of an ACK/NACK mapped to the at least one CCE based on a mapping rule between CCEs and resources for reception of the ACK/NACK, the resource for reception of the ACK/NACK identified by a cyclic shift index, an orthogonal sequence index, and a resource block index; and receiving the ACK/NACK information for the transmitted data using the checked resource. The mapping rule is that as an index corresponding to a CCE sequentially increases, the cyclic shift index increases until exhausted and then resets, the orthogonal sequence index increases each time the cyclic shift index is exhausted, until exhausted, and then resets, and the resource block index of resources for reception of the ACK/NACK increases each time the orthogonal sequence index is exhausted, until the resource block index is exhausted.

In accordance with another aspect of the present invention, a method is provided for transmitting ACK)/NACK information by a UE in a mobile communication system. The method includes receiving data and control information from a base station, the control information being received through a downlink control channel including at least one CCE; acquiring a resource for transmission of an ACK/NACK mapped to the at least one CCE based on a mapping rule between CCEs and resources for transmission of the ACK/NACK, the resource for transmission of the ACK/NACK identified by a cyclic shift index, an orthogonal sequence index, and a resource block index; and transmitting the ACK/NACK information for the received data using the acquired resource. The mapping rule is that as an index corresponding to a CCE sequentially increases, the cyclic shift index increases until exhausted and then resets, the orthogonal sequence index increases each time the cyclic shift index is exhausted, until exhausted, and then resets, and the resource block index of resources for reception of the ACK/NACK increases each time the orthogonal sequence index is exhausted, until the resource block index is exhausted.

In accordance with another aspect of the present invention, an apparatus is provided for receiving ACK)/NACK information at a base station in a mobile communication system. The apparatus includes a transmitter for transmitting data and control information to at least one UE, the control information being transmitted through a downlink control channel including at least one CCE; a controller for checking a resource for reception of an ACK/NACK mapped to the at least one CCE based on a mapping rule between CCEs and resources for reception of the ACK/NACK, the resource for reception of the ACK/NACK identified by a cyclic shift index, an orthogonal sequence index, and a resource block index; and a receiver for receiving the ACK/NACK information for the transmitted data using the checked resource. The mapping rule is that as an index corresponding to a CCE sequentially increases, the cyclic shift index increases until exhausted and then resets, the orthogonal sequence index increases each time the cyclic shift index is exhausted, until exhausted, and then resets, and the resource block index of resources for reception of the ACK/NACK increases each time the orthogonal sequence index is exhausted, until the resource block index is exhausted.

In accordance with another aspect of the present invention, an apparatus is provided for transmitting ACK/NACK information at a UE in a mobile communication system. The apparatus includes a receiver for receiving data and control information from a base station, the control information being received through a downlink control channel including at least one CCE; a controller for acquiring a resource for transmission of an ACK/NACK mapped to at least one CCE based on a mapping rule between CCEs and resources for transmission of the ACK/NACK, the resource for transmission of the ACK/NACK identified by a cyclic shift index, an orthogonal sequence index, and a resource block index; and a transmitter for transmitting the ACK/NACK information for the received data using the acquired resource. The mapping rule is that as an index corresponding to a CCE sequentially increases, the cyclic shift index increases until exhausted and then resets, the orthogonal sequence index increases each time the cyclic shift index is exhausted, until exhausted, and then resets, and the resource block index of resources for reception of the ACK/NACK increases each time the orthogonal sequence index is exhausted, until the resource block index is exhausted.

BRIEF DESCRIPTION OF THE DRAWINGS

The above and other aspects, features, and advantages of the present invention will become more apparent from the following detailed description when taken in conjunction with the accompanying drawings in which.

DETAILED DESCRIPTION OF EMBODIMENTS OF THE INVENTION

Various embodiments of the present invention will now be described in detail with reference to the annexed drawings. In the following description, a detailed description of known functions and configurations incorporated herein has been omitted for clarity and conciseness. Terms used herein are defined based on functions in the present invention and may vary according to users, operator intention, or usual practices. Therefore, the definition of the terms should be made based on contents throughout the specification.

The present invention provides a method for enabling efficient resource utilization and reception performance improvement, while minimizing the overhead required for signaling resource information for transmission of control information of a UE.

Further, the present invention provides a definition of an operation for a case where an RB for ACK/NACK transmission, cyclic shift values for a Zadoff-Chu sequence, and orthogonal sequences are used as resources for ACK/NACK transmission, and also provides a method for allocating and managing resources for ACK/NACK transmission.

Embodiment 1

Embodiment 1 of the present invention provides a method for mapping CCEs to resources for ACK/NACK transmission by preferentially fixing cyclic shift values of a Zadoff-Chu sequence, which are one type of the resources for UE ACK/NACK transmission, and changing indexes of the orthogonal sequences as CCE indexes of downlink control channels sequentially increase, in a case where a base station provides information on the resources for UE ACK/NACK transmission over the downlink control channels.

Figure 1:
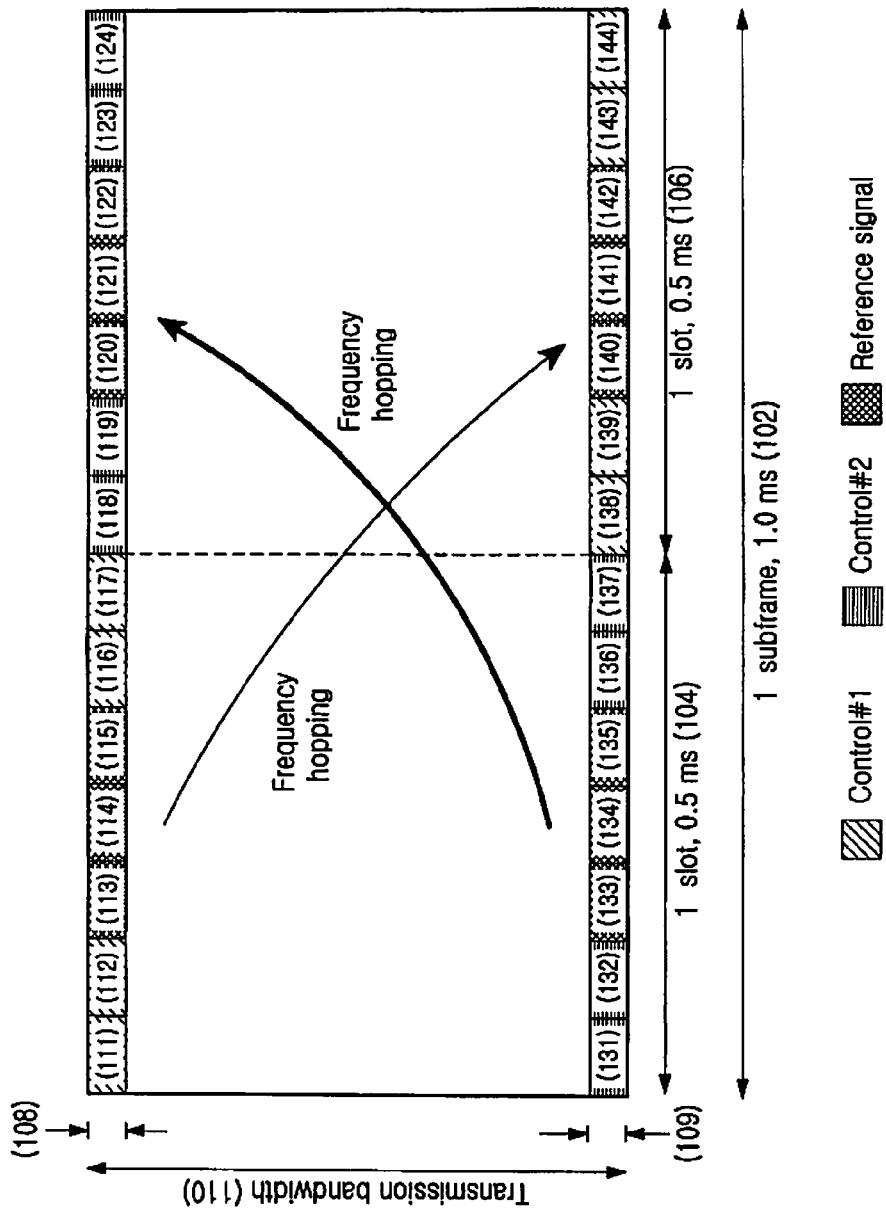
FIG. 1 is a diagram illustrating a transmission structure of a PUCCH for ACK/NACK transmission in an LTE system.
Figure 2:
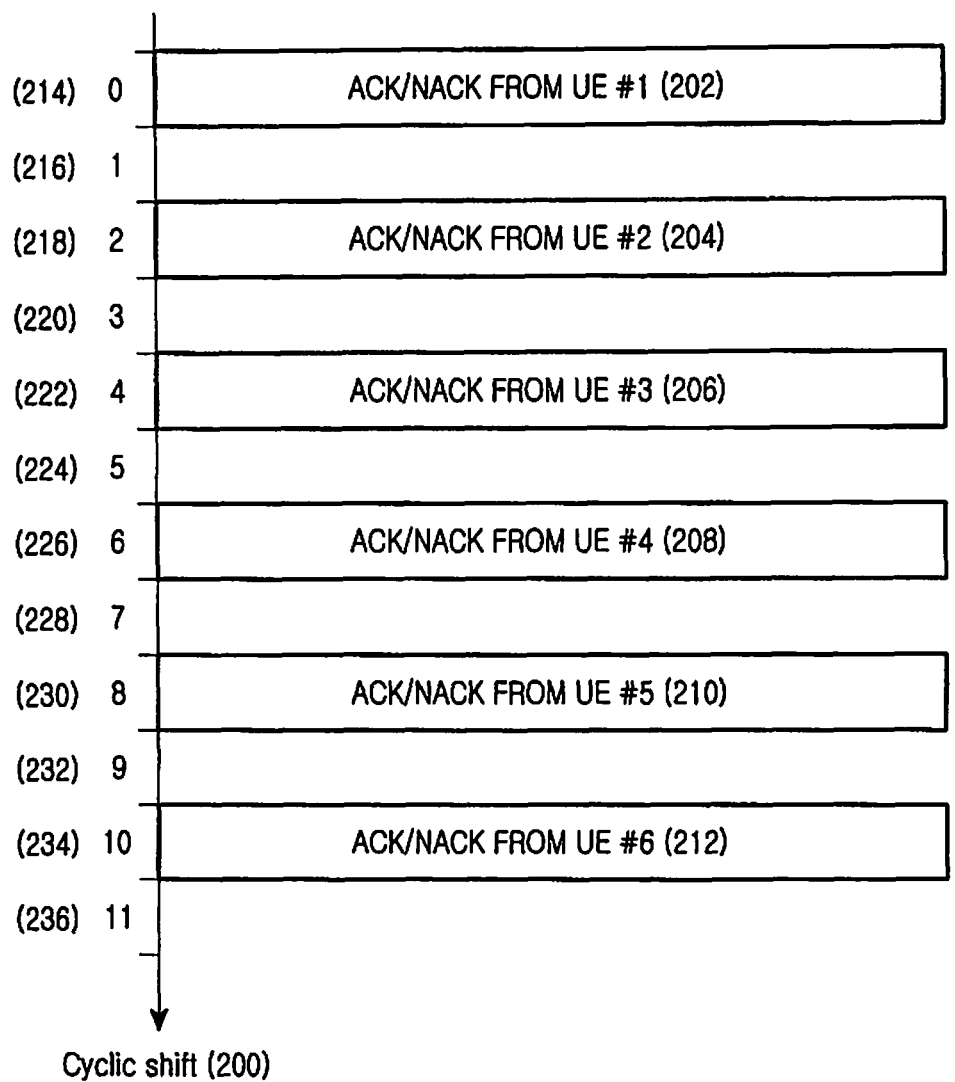
FIG. 2 is a diagram illustrating an example of allocating ACK/NACK resources using cyclic shift values of a Zadoff-Chu sequence.
Figure 3:
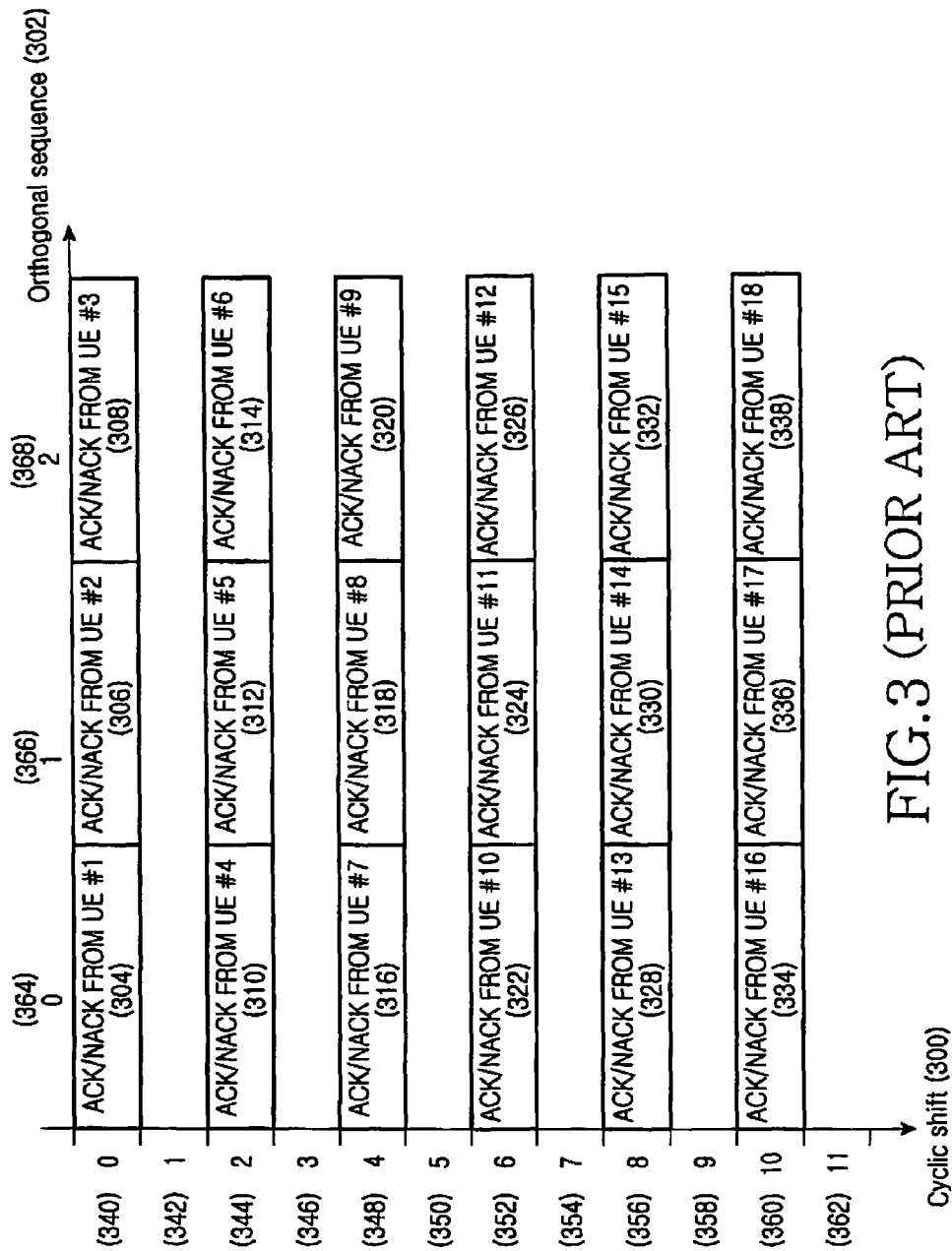
FIG. 3 is a diagram illustrating an example of allocating ACK/NACK resources using cyclic shift values of a Zadoff-Chu sequence and orthogonal sequences.
Figure 4:
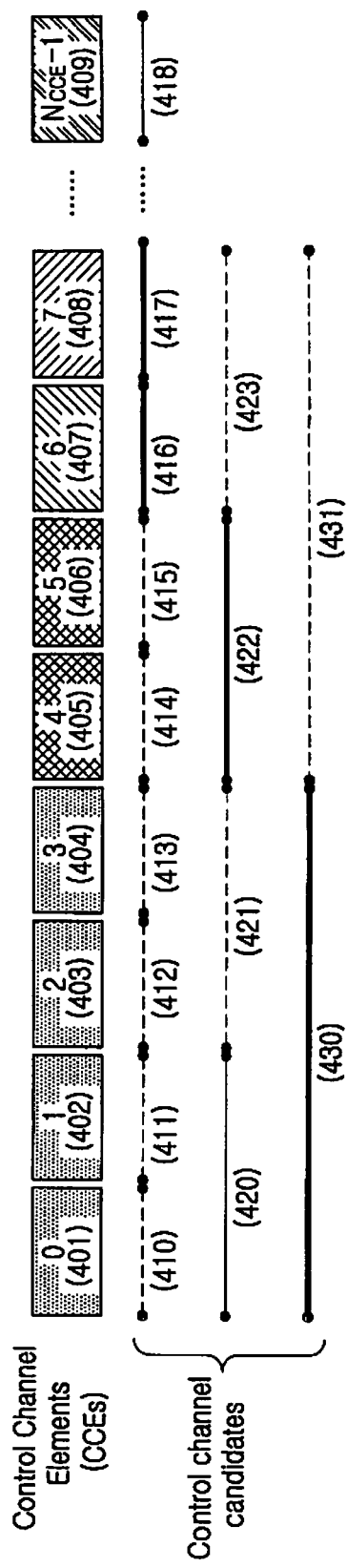
FIG. 4 is a diagram illustrating an example where a control channel includes CCEs.
Figure 5A:
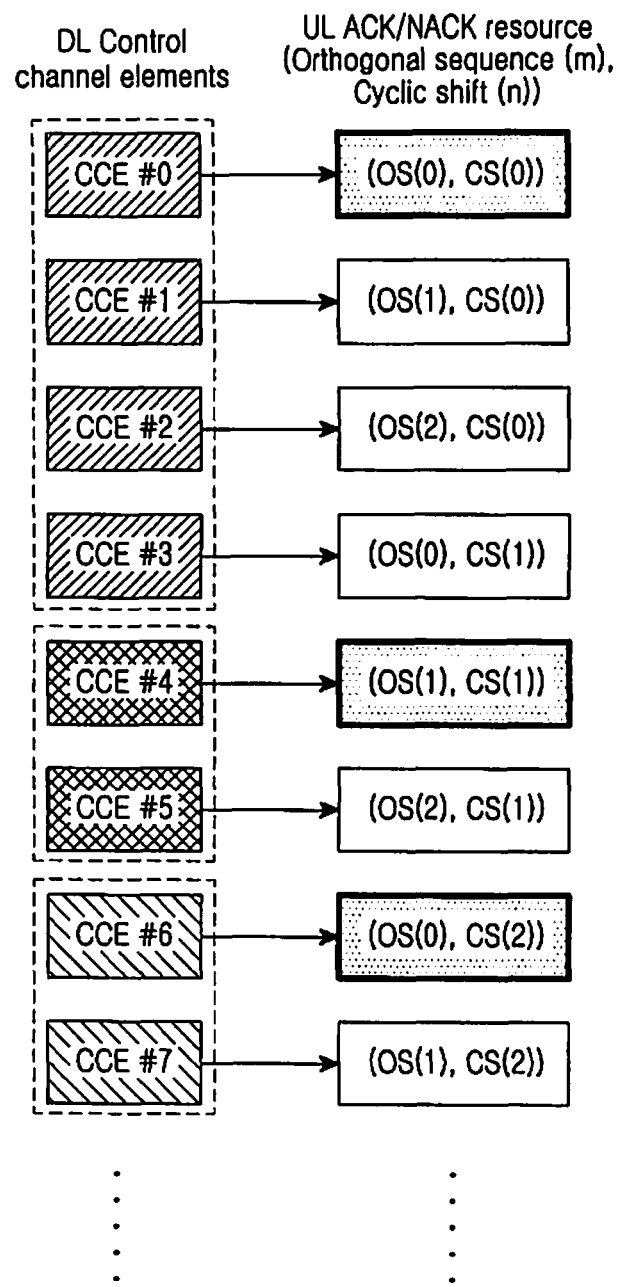
FIG. 5A is a diagram illustrating a mapping relation between control channels and resources for ACK/NACK transmission according to Embodiment 1 of the present invention.
Figure 5B:
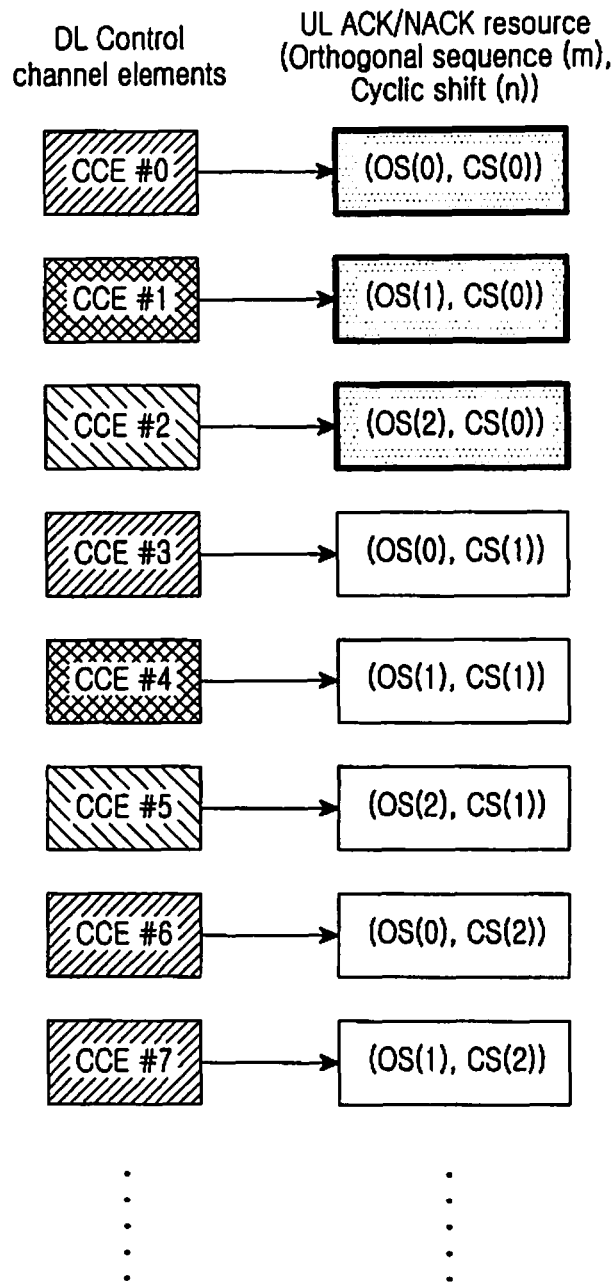
FIG. 5B is a diagram illustrating another mapping relation between control channels and resources for ACK/NACK transmission according to Embodiment 1 of the present invention.

FIG. 5A and FIG. 5B illustrate mapping relations between downlink control channels and resources for UE ACK/NACK transmission.

The resources for ACK/NACK transmission include RB information RB(o) (where o=0, 1, ..., $N_{RB}$−1), which is frequency-domain resource information; cyclic shift information CS(n) (where n=0, 1, ..., $N_{CS}$−1) indicating how many samples the Zadoff-Chu sequence is cyclic-shifted; and orthogonal sequence information OS(m) (where m=0, 1, ..., $N_{OS}$−1). It is assumed that a total of $N_{RB}$ RBs allocated for ACK/NACK transmission, a total of $N_{CS}$ cyclic shift values of a Zadoff-Chu sequence, and a total of $N_{OS}$ orthogonal sequences are allocated in the system.

FIG. 5A and FIG. 5B illustrate a method for one-to-one mapping CCEs to resources for ACK/NACK transmission by preferentially fixing indexes o for RB information for ACK/NACK transmission and indexes n for cyclic shift information indicating cyclic shift values of a Zadoff-Chu sequence, among the resources for UE ACK/NACK transmission, and sequentially increasing indexes m for the orthogonal sequence information as CCE indexes k of downlink control channels sequentially increase. Specifically, if the sequentially increased indexes of orthogonal sequences are all exhausted, the method increases the cyclic shift indexes n by one, and then sequentially increases indexes of the orthogonal sequences back from the beginning. If the cyclic shift indexes n are also all exhausted, after the above operation is repeated, the method increases indexes o for RB information for ACK/NACK transmission by one, and then repeatedly performs the above operation again.

A rule for one-to-one mapping a total of $N_{CCE}$ CCEs to resources for ACK/NACK transmission in this manner can be generalized as follows. The following Equation (1) is premised on the assumption that only an ACK/NACK is mapped to the RB allocated for ACK/NACK transmission. That is, no consideration is given to the case where other control information, such as Channel Quality Indicator (CQI) or MIMO feedback-related control information, is multiplexed with ACK/NACK in the same RB.

$$CCE(k) \rightarrow OS(m), CS(n), RB(o),$$

$$k=0,1,\ldots,N_{CCE}-1$$

$$m=k \bmod N_{OS}(m=0,1,\ldots,N_{OS}-1)$$

$$n=\mathrm{floor}(k/N_{OS}) \bmod N_{CS}(n=0,1,\ldots,N_{CS}-1)$$

$$o=\mathrm{floor}(k/(N_{OS}*N_{CS}))(o=0,1,\ldots,N_{RB}-1) \qquad (1)$$

In the above Equation (1), 'x mod y' indicates a remainder obtained by dividing x by y, and floor(z) is the greatest integer not greater than z.

For ease of description, if it is assumed in FIG. 5A and FIG. 5B that $N_{RB}$=1, $N_{CS}$=6 and $N_{OS}$=3, CCE(k) is one-to-one mapped to resources OS(m) CS(n) and RB(o) for ACK/NACK transmission, as follows.

CCE(0)→OS(0), CS(0), RB(0),
CCE(1)→OS(1), CS(0), RB(0),
CCE(2)→OS(2), CS(0), RB(0),
CCE(3)→OS(0), CS(1), RB(0),
CCE(4)→OS(1), CS(1), RB(0),
CCE(5)→OS(2), CS(1), RB(0),
CCE(6)→OS(0), CS(2), RB(0),
CCE(7)→OS(1), CS(2), RB(0),

When multiple CCEs constitute a downlink control channel, the CCEs can be consecutive, or can be scattered, i.e., inconsecutive, and this depends on the system operation. FIG. 5A illustrates the former case, while FIG. 5B illustrates the latter case.

FIG. 5A illustrates an example in which CCE(0), CCE(1), CCE(2), and CCE(3) constitute a downlink control channel including scheduling control information for UE #1; CCE(4) and CCE(5) constitute a downlink control channel including scheduling control information for UE #2; and CCE(6) and CCE(7) constitute a downlink control channel including scheduling control information for UE #3.

Because a UE only needs to transmit one ACK/NACK in response to the data channel and downlink control channel transmitted by a base station, the UE selects one of the resources for UE ACK/NACK transmission, mapped to multiple CCEs constituting the downlink control channel for each UE, and performs ACK/NACK transmission with the selected resources. The method of selecting resources for UE ACK/NACK transmission can be recognized in common by the base station and the UE under an agreement previously made therebetween. As a possible example, there is a method for setting ACK/NACK resources mapped to a CCE having the minimum index among the CCEs constituting a downlink control channel for the UE, as resources that the UE actually uses for ACK/NACK transmission. Therefore, in the example illustrated in FIG. 5A, UE #1 transmits an ACK/NACK using ACK/NACK resources OS(0), CS(0), and RB(0) mapped to CCE(0); UE #2 transmits ACK/NACK using ACK/NACK resources OS(1), CS(1), and RB(0) mapped to CCE(4); and UE #3 transmits ACK/NACK using ACK/NACK resources OS(0), CS(2), and RB(0) mapped to CCE(6).

With use of the foregoing method, the system minimizes the number of ACK/NACK signals multiplexed by orthogonal sequences for one cyclic shift if possible, thereby contributing to a decrease in interference between ACK/NACK signals from several UEs. In the situation where the change in wireless channels that the UEs experience is significant, like in the fast moving environment, this operation reduces performance degradation of ACK/NACK signals due to an orthogonality loss of the orthogonal sequences.

FIG. 5B illustrates an example in which CCE(0), CCE(3), CCE(6), and CCE(7) constitute a downlink control channel including scheduling control information for UE #1; CCE(1) and CCE(4) constitute a downlink control channel including scheduling control information for UE #2; and CCE(2) and CCE(5) constitute a downlink control channel including scheduling control information for UE #3.

There is a method for setting ACK/NACK resources mapped to a CCE having the minimum index among the CCEs constituting a downlink control channel for the UE, as resources that the UE actually uses for ACK/NACK transmission. In this case, in the example illustrated in FIG. 5B, UE #1 transmits ACK/NACK using ACK/NACK resources OS(0), CS(0), and RB(0) mapped to CCE(0); UE #2 transmits ACK/NACK using ACK/NACK resources OS(1), CS(0), and RB(0) mapped to CCE(1); and UE #3 transmits ACK/NACK using ACK/NACK resources OS(2), CS(0), and RB(0) mapped to CCE(2).

In the example illustrated in FIG. 5B, because only CS(0) is used as cyclic shift resources for ACK/NACK transmission, the remaining cyclic shift resources CS(1), CS(2), CS(3), CS(4), and CS(5) can be allocated for transmission of other control information such as CQI information. If multiple RBs for ACK/NACK transmission are allocated in the system, because only RB(0) is used in the example illustrated in FIG. 5B, the RBs allocated for transmission of the remaining ACK/NACK can be allocated for transmission of other control information or data.

Figure 6:
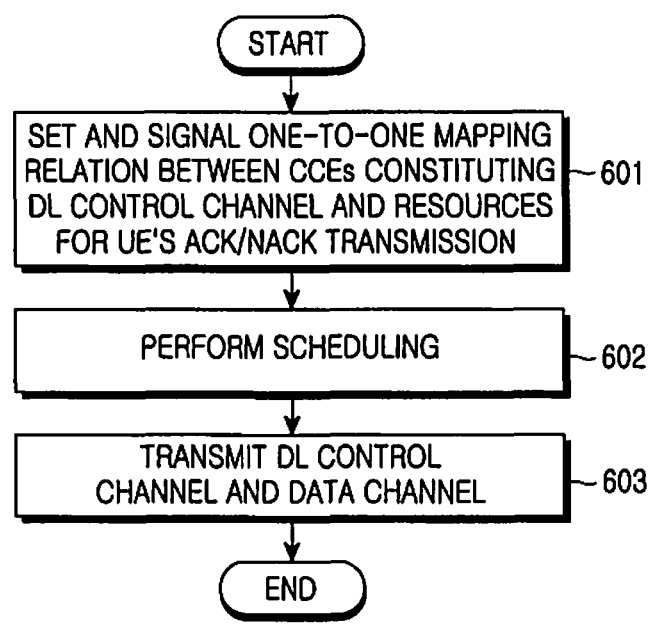
FIG. 6 is a diagram illustrating an operating procedure of a base station according to an embodiment of the present invention.

FIG. 6 illustrates a procedure in which a base station provides a UE with information on resources for ACK/NACK transmission to perform the forgoing operation.

Referring to FIG. 6, in step 601, a base station sets a one-to-one mapping relation between CCEs constituting a downlink control channel and resources for UE ACK/NACK transmission, sets a method by which a UE acquires the resources for ACK/NACK transmission, and provides the corresponding information to the UE. The resources for UE ACK/NACK transmission include RB information, which is frequency-domain resource information, cyclic shift information of a Zadoff-Chu sequence, and orthogonal sequence information. The one-to-one mapping relation and the resource acquisition method for ACK/NACK transmission can be recognized in common by the base station and the UE under an agreement previously made therebetween, or by signaling from the base station to the UE.

In step 602, the base station determines whether to transmit a downlink data channel through a predetermined scheduling operation, and when the base station determines to transmit the downlink data channel, it determines resources for downlink data channel transmission and a transmission format.

In step 603, the base station transmits the downlink data channel according to the resources for downlink data channel transmission and the transmission format, determined in step 602. Further, the base station transmits a downlink control channel including the resources for downlink data channel transmission and the transmission format. A UE acquires resources for UE ACK/NACK transmission from the received downlink control channel under an agreement previously made therebetween, or according to the information signaled from the base station in step 601.

Figure 7:
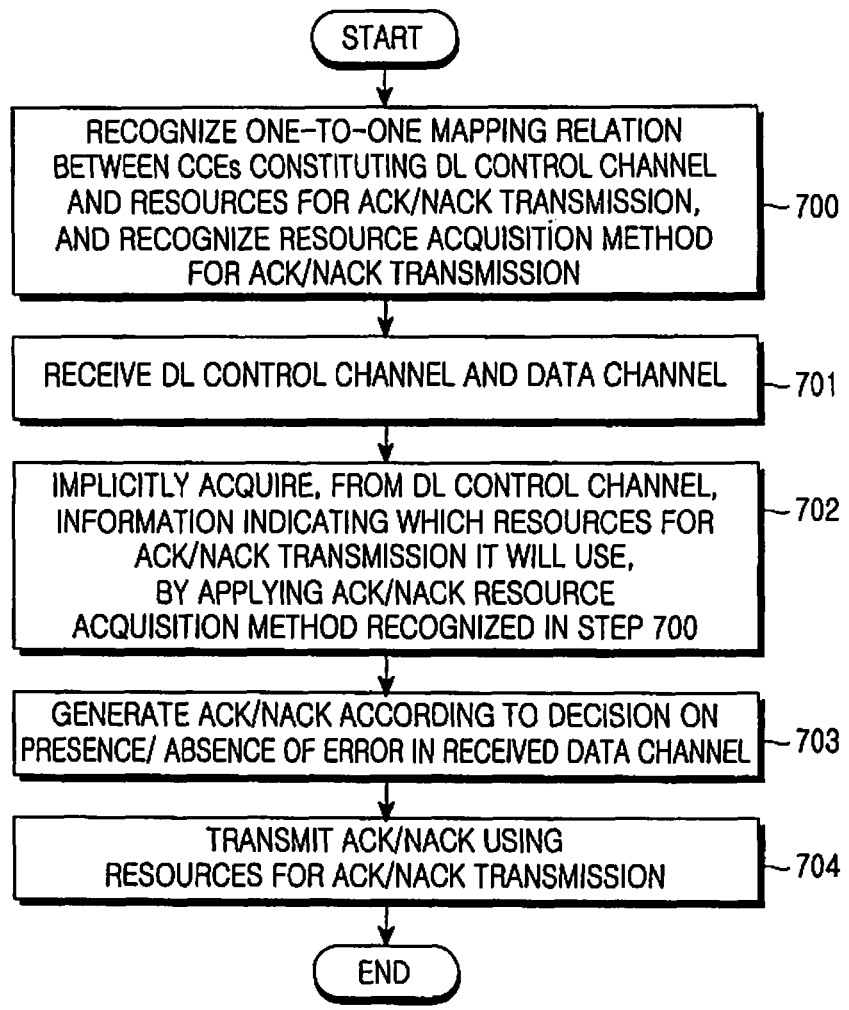
FIG. 7 is a diagram illustrating an operating procedure of a UE according to an embodiment of the present invention.

FIG. 7 illustrates a procedure in which a UE acquires resources for ACK/NACK transmission from a base station and transmits ACK/NACK with the acquired resources to perform the foregoing operation.

Referring to FIG. 7, in step 700, a UE recognizes a one-to-one mapping relation between CCEs constituting a downlink control channel and resources for ACK/NACK transmission, and a resource acquisition method for ACK/NACK transmission under an agreement previously made therebetween, or based on the information signaled from a base station. The resources for ACK/NACK transmission include RB information, which is frequency-domain resource information, cyclic shift information of a Zadoff-Chu sequence, and orthogonal sequence information.

In step 701, the UE receives, from the base station, a data channel to which HARQ is applied, and its associated downlink control channel. The downlink control channel includes resource information of a data channel that the base station transmits for a particular UE, and downlink scheduling control information indicating a transmission format, and includes one or multiple CCEs.

In step 702, the UE acquires resources for ACK/NACK transmission from the received downlink control channel according to the one-to-one mapping relation between CCEs and resources for ACK/NACK transmission and the resource acquisition method for ACK/NACK transmission, recognized in step 700.

In step 703, the UE decodes the received data channel to determine the presence/absence of an error, and generates an ACK in the absence of an error and a NACK in the presence of an error. The ACK/NACK signal is generated so that it is repeated several times for reception performance improvement and cell coverage expansion.

In step 704, the UE maps the generated ACK/NACK to the resources for ACK/NACK transmission acquired in step 702, and transmits ACK/NACK.

Embodiment 2

Embodiment 2 provides a method for mapping CCEs to resources for ACK/NACK transmission by preferentially fixing indexes of orthogonal sequences, which are one type of the resources for UE ACK/NACK transmission, and changing cyclic shift values of the Zadoff-Chu sequence as CCE indexes of downlink control channels sequentially increase, in a case where a base station provides information on the resources for UE ACK/NACK transmission over the downlink control channels.

Figure 8A:
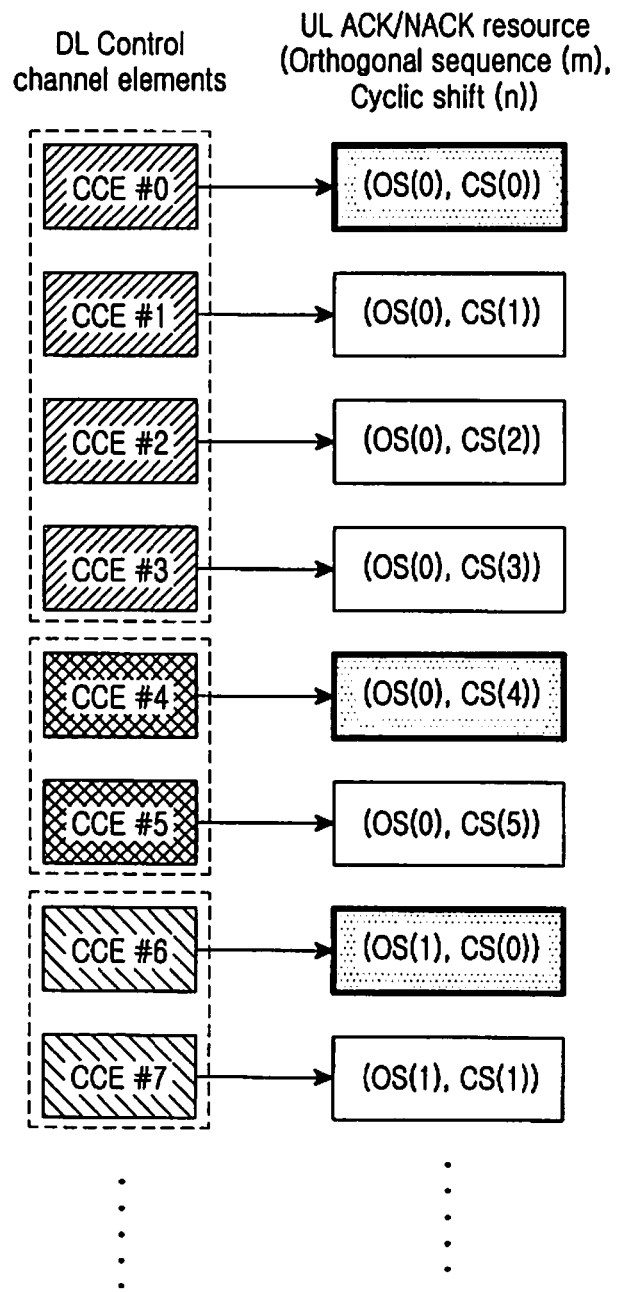
FIG. 8A is a diagram illustrating a mapping relation between control channels and resources for ACK/NACK transmission according to Embodiment 2 of the present invention.
Figure 8B:
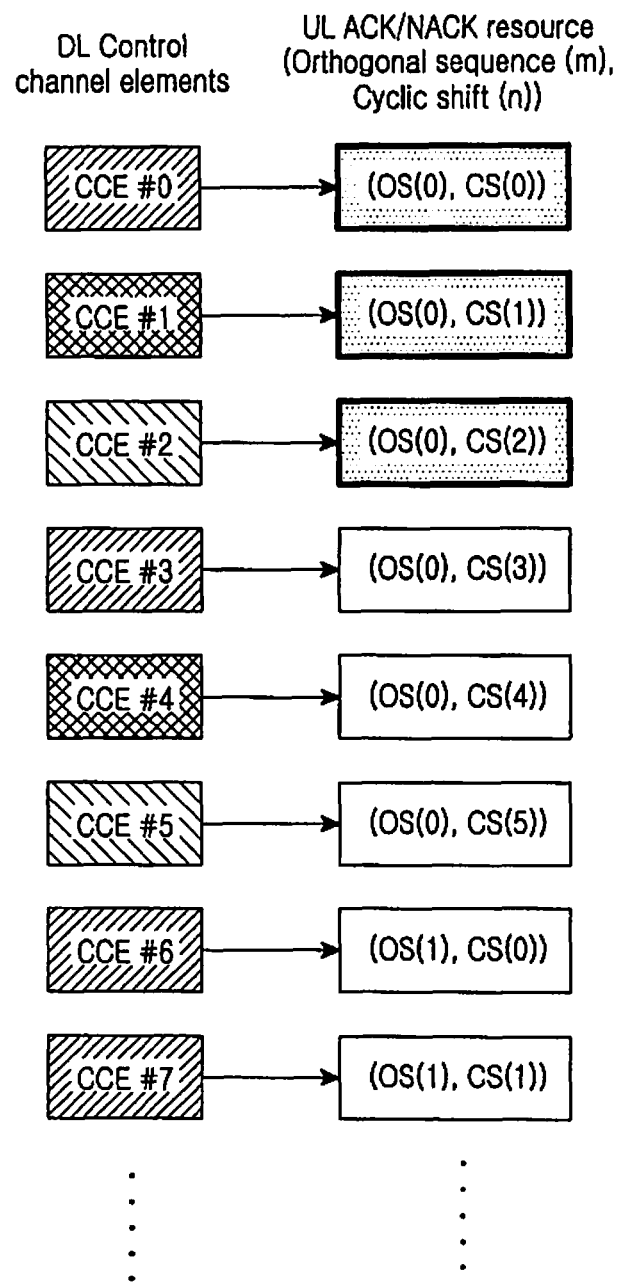
FIG. 8B is a diagram illustrating another mapping relation between control channels and resources for ACK/NACK transmission according to Embodiment 2 of the present invention.

FIG. 8A and FIG. 8B illustrate mapping relations between downlink control channels and resources for UE ACK/NACK transmissions. The resources for ACK/NACK transmission include RB information RB(o) (where o=0, 1, ..., $N_{RB}-1$), which is frequency-domain resource information; cyclic shift information CS(n) (where n=0, 1, ..., $N_{CS}-1$) indicating how many samples the Zadoff-Chu sequence is cyclic-shifted; and orthogonal sequence information OS(m) (where m=0, 1, ..., $N_{OS}-1$). It is assumed that a total of $N_{RB}$ RBs allocated for ACK/NACK transmission, a total of $N_{CS}$ cyclic shift values of a Zadoff-Chu sequence, and a total of $N_{OS}$ orthogonal sequences are allocated in the system.

FIG. 8A and FIG. 8B illustrate a method for one-to-one mapping CCEs to resources for ACK/NACK transmission by preferentially fixing indexes o for RB information for ACK/NACK transmission and indexes m for orthogonal sequence information among the resources for UE ACK/NACK transmission, and sequentially increasing indexes n for cyclic shift information indicating cyclic shift values of the Zadoff-Chu sequence as CCE indexes k of downlink control channels sequentially increase. Specifically, if the sequentially increased indexes for the cyclic shift information are all exhausted, the method increases indexes m for the orthogonal sequence information by one, and then sequentially increases indexes for the cyclic shift information back from the beginning. If the indexes m for the orthogonal sequence information are also all exhausted, after the above operation is repeated, the method increases indexes o for RB information for ACK/NACK transmission by one, and then repeatedly performs the above operation again.

A rule for one-to-one mapping a total of $N_{CCE}$ CCEs to resources for ACK/NACK transmission in this manner can be generalized as follows. The following Equation (2) is premised on the assumption that only ACK/NACK is mapped to the RB allocated for ACK/NACK transmission. That is, no consideration is given to the case where other control information, such as CQI or MIMO feedback-related control information, is multiplexed with ACK/NACK in the same RB.

$$CCE(k) \to OS(m), CS(n), RB(o),$$

$$k=0,1,\ldots,N_{CCE}-1$$

$$m=\mathrm{floor}(k/N_{CS}) \bmod N_{OS}(m=0,1,\ldots,N_{OS}-1)$$

$$n=k \bmod N_{CS}(n=0,1,\ldots,N_{CS}-1)$$

$$o=\mathrm{floor}(k/(N_{OS}*N_{CS}))(o=0,1,\ldots,N_{RB}-1) \quad (2)$$

In the above Equation (2), 'x mod y' indicates a remainder obtained by dividing x by y, and floor(z) is the greatest integer not greater than z.

For ease of description, if it is assumed in FIG. 8A and FIG. 8B that $N_{RB}=1$, $N_{OS}=6$ and $N_{OS}=3$, CCE(k) is one-to-one mapped to resources OS(m) CS(n) and RB(o) for ACK/NACK transmission, as follows.

CCE(0)→OS(0), CS(0), RB(0),
CCE(1)→OS(0), CS(1), RB(0),
CCE(2)→OS(0), CS(2), RB(0),
CCE(3)→OS(0), CS(3), RB(0),
CCE(4)→OS(0), CS(4), RB(0),
CCE(5)→OS(0), CS(5), RB(0),
CCE(6)→OS(1), CS(0), RB(0),
CCE(7)→OS(1), CS(1), RB(0),

When multiple CCEs are included in a downlink control channel, the CCEs can be consecutive, or can be scattered, i.e., inconsecutive, and this depends on the system operation. FIG. 8A illustrates the former case, while FIG. 8B illustrates the latter case. In particular, Embodiment 2 is suitable for the case where only some of a total of $N_{CCE}$ CCEs constitute a downlink control channel for each UE at an arbitrary time. For example, FIGS. 8A and 8B illustrate the cases where 8 CCEs among a total of $N_{CCE}$ CCEs constitute a downlink control channel for each UE.

FIG. 8A illustrates an example in which CCE(0), CCE(1), CCE(2), and CCE(3) constitute a downlink control channel including scheduling control information for UE #1; CCE(4) and CCE(5) constitute a downlink control channel including scheduling control information for UE #2; and CCE(6) and CCE(7) constitute a downlink control channel including scheduling control information for UE #3.

Because a UE only needs to transmit one ACK/NACK in response to the data channel and downlink control channel transmitted by a base station, the UE selects one of the resources for UE ACK/NACK transmission, mapped to multiple CCEs constituting the downlink control channel for each UE, and performs ACK/NACK transmission with the selected resources. The method of selecting resources for UE ACK/NACK transmission can be recognized in common by the base station and the UE under an agreement previously made therebetween. As a possible example, there is a method for setting ACK/NACK resources mapped to a CCE having the minimum index among the CCEs constituting a downlink control channel for the UE, as resources that the UE actually uses for ACK/NACK transmission. Therefore, in the example illustrated in FIG. 8A, UE #1 transmits ACK/NACK using ACK/NACK resources OS(0), CS(0) and RB(0) mapped to CCE(0); UE #2 transmits ACK/NACK using ACK/NACK resources OS(0), CS(4) and RB(0) mapped to CCE(4); and UE #3 transmits ACK/NACK using ACK/NACK resources OS(1), CS(0) and RB(0) mapped to CCE(6).

FIG. 8B illustrates an example in which CCE(0), CCE(3), CCE(6), and CCE(7) constitute a downlink control channel including scheduling control information for UE #1; CCE(1) and CCE(4) constitute a downlink control channel including scheduling control information for UE #2; and CCE(2) and CCE(5) constitute a downlink control channel including scheduling control information for UE #3.

There is a method for setting ACK/NACK resources mapped to a CCE having the minimum index among the CCEs constituting a downlink control channel for the UE, as resources that the UE actually uses for ACK/NACK transmission. In this case, in the example illustrated in FIG. 8B, UE #1 transmits ACK/NACK using ACK/NACK resources OS(0), CS(0), and RB(0) mapped to CCE(0); UE #2 transmits ACK/NACK using ACK/NACK resources OS(0), CS(1), and RB(0) mapped to CCE(1); and UE #3 transmits ACK/NACK using ACK/NACK resources OS(0), CS(2), and RB(0) mapped to CCE(2).

In addition, a definition can be given of a rule for one-to-one mapping a total of $N_{CCE}$ CCEs to resources for ACK/NACK transmission by applying the following Equation (3), aside from the operation based on the Equation (2) of Embodiment 2. The following Equation (3) is based on the assumption that only ACK/NACK is mapped to the RB allocated for ACK/NACK transmission. That is, no consideration is given to the case where other control information, such as CQI or MIMO feedback-related control information, is multiplexed with ACK/NACK in the same RB. A definition of $N_{CST}$ is additionally given below.

$$CCE(k) \to OS(m), CS(n), RB(o),$$

$$k=0,1,\ldots N_{CCE}-1$$

$$N_{CST}=\mathrm{CEIL}(Ncce/N_{OS})$$

$$m=\mathrm{floor}(k/Ncst) \bmod N_{OS}(m=0,1,\ldots N_{OS}-1)$$

$$n=k \bmod N_{CS}(n=0,1,\ldots N_{CS}-1)$$

$$o=\mathrm{floor}((k \bmod Nos)/Ncs) \quad (3)$$

In the above Equation (3), CEIL(x) is the smallest integer not less than x.

For example, if it is assumed that $N_{RB}=2$, $N_{CS}=6$, $N_{OS}=3$, $N_{CST}=8$ and $N_{CCE}=24$, CCE(k) is one-to-one mapped to resource OS(m), CS(n) and RB(o) for ACK/NACK transmission, as follows.

CCE(0)→OS(0), CS(0), RB(0),
CCE(1)→OS(0), CS(1), RB(0),
CCE(2)→OS(0), CS(2), RB(0),
CCE(3)→OS(0), CS(3), RB(0),
CCE(4)→OS(0), CS(4), RB(0),
CCE(5)→OS(0), CS(5), RB(0),
CCE(6)→OS(0), CS(0), RB(1),
CCE(7)→OS(0), CS(1), RB(1),
CCE(8)→OS(1), CS(0), RB(0)
CCE(9)→S(1), CS(1), RB(0)

In the above example, if $N_{CS}=6$ pre-allocated cyclic shift resources among the resources for ACK/NACK transmission mapped to CCEs are all exhausted for CCE(0) up to CCE(5), CCE(6) is, for example, mapped to a cyclic shift CS(0) and an orthogonal sequence OS(0) of the second RB RB(1) allocated for ACK/NACK transmission. For up to CCE(7), its mapping to $N_{CST}=8$ or less resources for ACK/NACK transmission is completed, and back for CCE(8), it is mapped to a cyclic shift CS(0) and an orthogonal sequence OS(1) unused in RB(0). Through this method, ACK/NACK is mapped to CCEs in order to prevent degradation of ACK/NACK reception performance due to an orthogonality loss of the orthogonal sequences.

Embodiment 3

Embodiment 3 provides a method for mapping CCEs to resources for ACK/NACK transmission in the manner of changing both indexes of orthogonal sequences and cyclic shift values of a Zadoff-Chu sequence among the resources for UE ACK/NACK transmission as CCE indexes of downlink control channels sequentially increase, in the case where a base station provides information on the resources for UE ACK/NACK transmission over the downlink control channels.

Figure 9A:
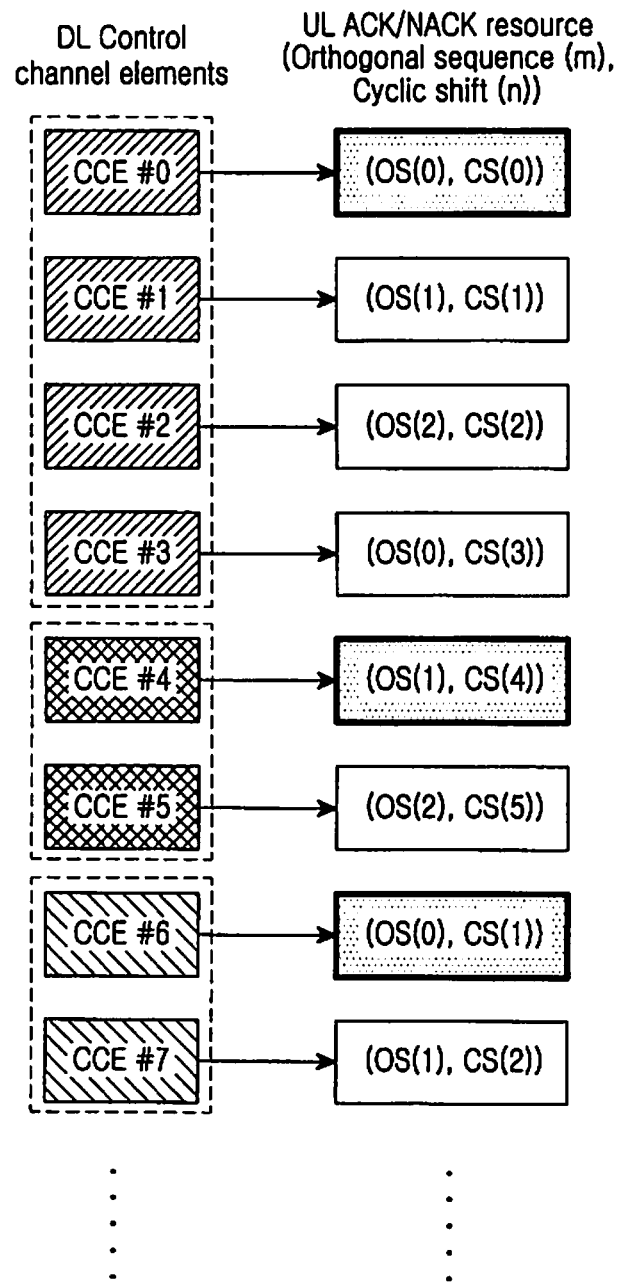
FIG. 9A is a diagram illustrating a mapping relation between control channels and resources for ACK/NACK transmission according to Embodiment 3 of the present invention.
Figure 9B:
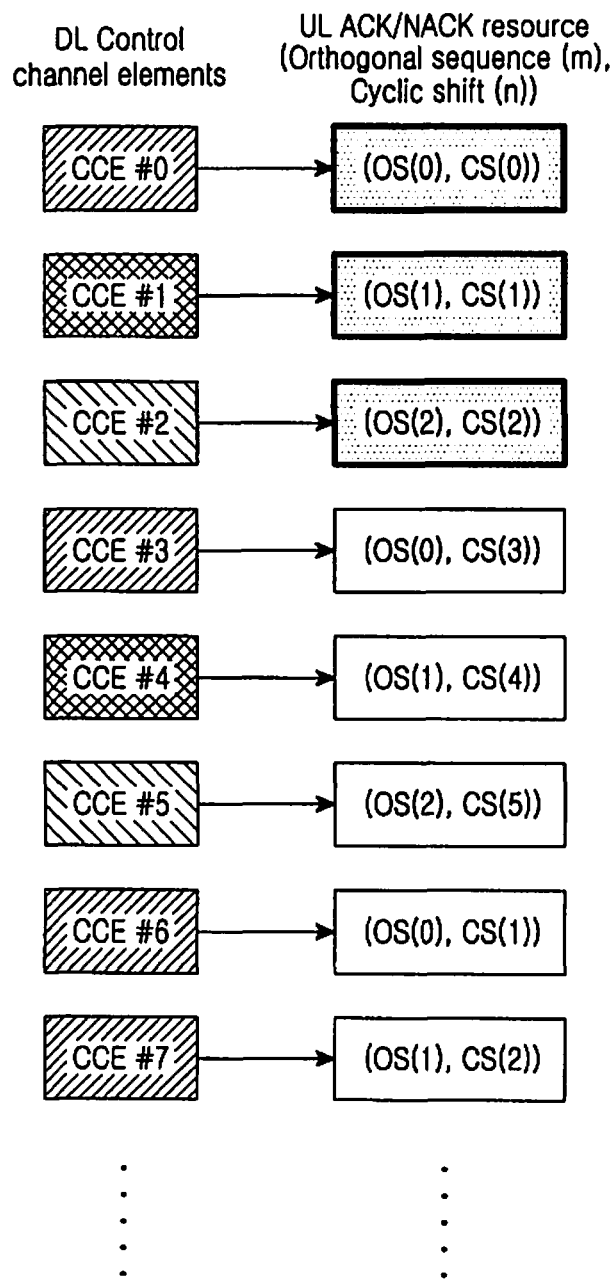
FIG. 9B is a diagram illustrating another mapping relation between control channels and resources for ACK/NACK transmission according to Embodiment 3 of the present invention.

FIG. 9A and FIG. 9B illustrate mapping relations between downlink control channels and resources for UE ACK/NACK transmission. The resources for ACK/NACK transmission include RB information RB(o) (where o=0, 1, . . . , $N_{RB}-1$), which is frequency-domain resource information; cyclic shift information CS(n) (where n=0, 1, . . . , $N_{OS}-1$) indicating how many samples the Zadoff-Chu sequence is cyclic-shifted; and orthogonal sequence information OS(m) (where m=0, 1, . . . , $N_{OS}-1$). It is assumed that a total of $N_{RB}$ RBs allocated for ACK/NACK transmission, a total of $N_{CS}$ cyclic shift values of a Zadoff-Chu sequence, and a total of $N_{OS}$ orthogonal sequences are allocated in the system.

FIG. 9A and FIG. 9B illustrate a method for one-to-one mapping CCEs to resources for ACK/NACK transmission by preferentially fixing indexes o for RB information for ACK/NACK transmission among the resources for UE ACK/NACK transmission and sequentially increasing indexes m for the orthogonal sequence information and indexes n for the cyclic shift information indicating the cyclic shift value of a Zadoff-Chu sequence as CCE indexes k of downlink control channels sequentially increase. To maintain the one-to-one mapping relation, a mapping rule between indexes m or indexes n and CCEs can be mixed. If indexes m for the orthogonal sequence information and indexes n for the cyclic shift information indicating cyclic shift values of the Zadoff-Chu sequence, acceptable by one RB for ACK/NACK transmission, are all exhausted, the method increases indexes o for the RB information for ACK/NACK transmission by one, and then repeatedly performs the operation again.

The rule for one-to-one mapping a total of $N_{CCE}$ CCEs to resources for ACK/NACK transmission in this manner can be expressed as follows in Equation (4).

$$CCE(k) \rightarrow OS(m), CS(n), RB(o),$$

$$k=0,1,\ldots,N_{CCE}-1$$

$$M=k \bmod N_{OS} (m=0,1,\ldots,N_{OS}-1)$$

$$n=k+\mathrm{floor}(k/N_{CS}) \bmod N_{CS} (n=0,1,\ldots,N_{CS}-1)$$

$$o=\mathrm{floor}(k/(N_{OS}*N_{CS}))(o=0,1,\ldots,N_{RB}-1) \quad (4)$$

In the above Equation (4), 'x mod y' indicates a remainder obtained by dividing x by y, and floor(z) is the greatest integer not greater than z.

For ease of description, if it is assumed in FIG. 9A and FIG. 9B that $N_{RB}=1$, $N_{CS}=6$ and $N_{OS}=3$, CCE(k) is one-to-one mapped to resources OS(m) CS(n) and RB(o) for ACK/NACK transmission, as follows.

CCE(0)→OS(0), CS(0), RB(0),
CCE(1)→OS(1), CS(1), RB(0),
CCE(2)→OS(2), CS(2), RB(0),
CCE(3)→OS(0), CS(3), RB(0),
CCE(4)→OS(1), CS(4), RB(0),
CCE(5)→OS(2), CS(5), RB(0),
CCE(6)→OS(0), CS(1), RB(0),
CCE(7)→OS(1), CS(2), RB(0),

When multiple CCEs constitute a downlink control channel, the CCEs can be consecutive, or can be scattered, i.e., inconsecutive, and this depends on the system operation. FIG. 9A illustrates the former case, while FIG. 9B illustrates the latter case.

FIG. 9A illustrates an example in which CCE(0), CCE(1), CCE(2), and CCE(3) constitute a downlink control channel including scheduling control information for UE #1; CCE(4) and CCE(5) constitute a downlink control channel including scheduling control information for UE #2; and CCE(6) and CCE(7) constitute a downlink control channel including scheduling control information for UE #3.

Because a UE only needs to transmit one ACK/NACK in response to the data channel and downlink control channel transmitted by a base station, the UE selects one of the resources for UE ACK/NACK transmission, mapped to multiple CCEs constituting the downlink control channel for each UE, and performs ACK/NACK transmission with the selected resources. The method of selecting resources for UE ACK/NACK transmission can be recognized in common by the base station and the UE under an agreement previously made therebetween. As a possible example, there is a method for setting ACK/NACK resources mapped to a CCE having the minimum index among the CCEs constituting a downlink control channel for the UE, as resources that the UE actually uses for ACK/NACK transmission. Therefore, in the example illustrated in FIG. 9A, UE #1 transmits ACK/NACK using ACK/NACK resources OS(0), CS(0) and RB(0) mapped to CCE(0); UE #2 transmits ACK/NACK using ACK/NACK resources OS(1), CS(4) and RB(0) mapped to CCE(4); and UE #3 transmits ACK/NACK using ACK/NACK resources OS(0), CS(1) and RB(0) mapped to CCE(6).

FIG. 9B illustrates an example in which CCE(0), CCE(3), CCE(6), and CCE(7) constitute a downlink control channel including scheduling control information for UE #1; CCE(1) and CCE(4) constitute a downlink control channel including scheduling control information for UE #2; and CCE(2) and CCE(5) constitute a downlink control channel including scheduling control information for UE #3.

There is a method for setting ACK/NACK resources mapped to a CCE having the minimum index among the CCEs constituting a downlink control channel for the UE, as resources that the UE actually uses for ACK/NACK transmission. In this case, in the example illustrated in FIG. 9B, UE #1 transmits ACK/NACK using ACK/NACK resources OS(0), CS(0), and RB(0) mapped to CCE(0); UE #2 transmits ACK/NACK using ACK/NACK resources OS(1), CS(1), and RB(0) mapped to CCE(1); and UE #3 transmits ACK/NACK using ACK/NACK resources OS(2), CS(2), and RB(0) mapped to CCE(2).

Embodiment 3a

Embodiment 3a provides a method for mapping CCEs to resources for ACK/NACK transmission by changing indexes of orthogonal sequences and cyclic shift values of the Zadoff-Chu sequence among the resources for UE ACK/NACK transmission according to a predetermined pattern as CCE indexes of downlink control channels sequentially increase, in the case where a base station provides information on the resources for UE ACK/NACK transmission over the downlink control channels. Embodiment 3a is suitable especially for when the maximum delay spread of the wireless transmission path is great.

Figure 10A:
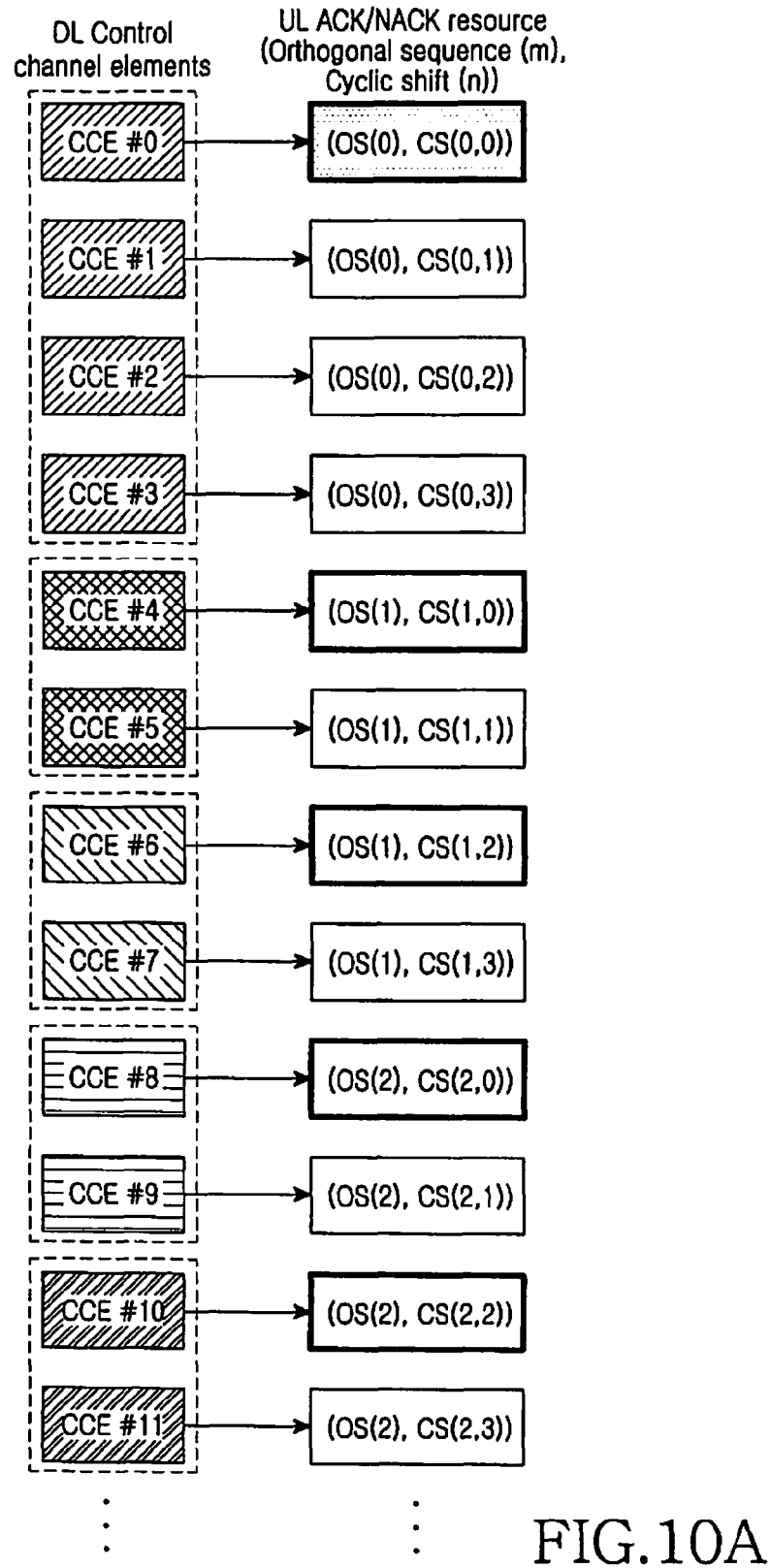
FIG. 10A is a diagram illustrating a mapping relation between control channels and resources for ACK/NACK transmission according to Embodiment 3a of the present invention.
Figure 10B:
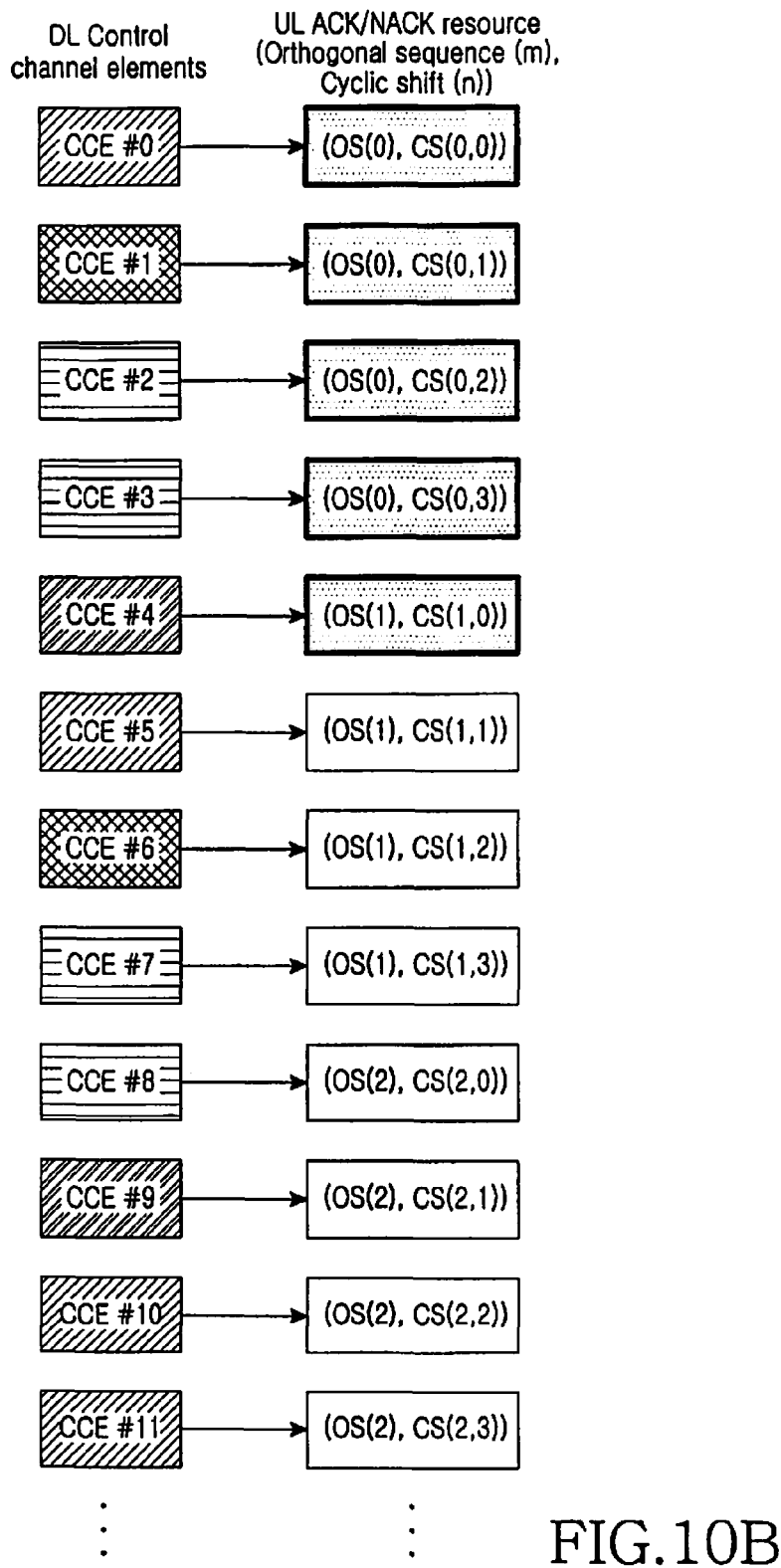
FIG. 10B is a diagram illustrating another mapping relation between control channels and resources for ACK/NACK transmission according to Embodiment 3a of the present invention.

FIG. 10A and FIG. 10B illustrate mapping relations between downlink control channels and resources for UE ACK/NACK transmission. The resources for ACK/NACK transmission include RB information RB(o) (where o=0, 1, ..., $N_{RB}$−1), which is frequency-domain resource information; cyclic shift information CS(n) (where n=0, 1, ..., $N_{CS}$−1) indicating how many samples the Zadoff-Chu sequence is cyclic-shifted; and orthogonal sequence information OS(m) (where m=0, 1, ..., $N_{OS}$−1). It is assumed that a total of $N_{RB}$ RBs allocated for ACK/NACK transmission are allocated in the system, a total of $N_{CS}$ cyclic shift values of a Zadoff-Chu sequence are allocated in one RB for ACK/NACK transmission, and a total of $N_{OS}$ orthogonal sequences are allocated in one RB for ACK/NACK transmission.

FIG. 10A and FIG. 10B illustrate a method for one-to-one mapping CCEs to resources for ACK/NACK transmission by preferentially fixing indexes o for the RB information for ACK/NACK transmission among the resources for UE ACK/NACK transmission, and sequentially increasing indexes n for the cyclic shift information of the Zadoff-Chu sequence, after additionally fixing indexes m for the orthogonal sequence information as CCE indexes k of downlink control channels sequentially increase. In this case, the method changes the cyclic shift information of the Zadoff-Chu sequence indicated by the indexes n according to the indexes m for the orthogonal sequence information, and minimizes the number of the orthogonal sequences mapped to the given cyclic shift values, thereby minimizing the interference between the orthogonal sequences. Table 1 shows an example of cyclic shift information of a Zadoff-Chu sequence and orthogonal sequence information, used for ACK/NACK transmission in one RB for ACK/NACK transmission.

TABLE 1

| Cyclic shift information (CS(m, n)) of Zadoff-Chu sequence | OS(0) | OS(1) | OS(2) |
|---|---|---|---|
| 0 | ACK/NACK #0 | | |
| 1 | | ACK/NACK #4 | |
| 2 | | | ACK/NACK #8 |
| 3 | ACK/NACK #1 | | |
| 4 | | ACK/NACK #5 | |
| 5 | | | ACK/NACK #9 |
| 6 | ACK/NACK #2 | | |
| 7 | | ACK/NACK #6 | |
| 8 | | | ACK/NACK #10 |
| 9 | ACK/NACK #3 | | |
| 10 | | ACK/NACK #7 | |
| 11 | | | ACK/NACK #11 |

The mapping scheme of Table 1 prevents degradation of orthogonality by allowing cyclic shift values of the Zadoff-Chu sequence used for ACK/NACK transmission to have a longer 3-sample interval, and cancels interference between orthogonal sequences by one-to-one mapping orthogonal sequences to the given cyclic shift values of the Zadoff-Chu sequence, in the environment having a great maximum delay spread of a wireless transmission path. In Table 1, ACK/NACK #1-ACK/NACK #11 are transmitted through the resources defined as a combination of the cyclic shift information of the Zadoff-Chu sequence and the orthogonal sequence information, and a maximum of 12 ACK/NACK signals can undergo multiplexing in one RB in sequence in order of ACK/NACK #1, ACK/NACK 2, ... ACK/NACK #11.

If the sequentially increased indexes for the cyclic shift information of the Zadoff-Chu sequence are all exhausted after indexes o for the RB information for ACK/NACK transmission and indexes m for the orthogonal sequence information are fixed, the scheme increases indexes m for the orthogonal sequence information by one, and then sequentially increases indexes for the cyclic shift information indicating the cyclic shift values of the Zadoff-Chu sequence back from the beginning. If the indexes m for the orthogonal sequence information are also all exhausted, after the above operation is repeated, the scheme increases indexes o for the RB information for ACK/NACK transmission by one, and then repeatedly performs the operation again. Generally, the base station allocates and manages RBs for ACK/NACK transmission on a semi-static basis, and there is a possible case where only some of the allocated RBs for ACK/NACK transmission are used for ACK/NACK transmission at an arbitrary time. In this case, the base station can schedule the RBs actually unused for ACK/NACK transmission though they are allocated for ACK/NACK transmission, as resources for another purpose, for example, as resources for UE data transmission.

A rule for one-to-one mapping a total of $N_{CCE}$ CCEs to resources for ACK/NACK transmission in this manner can be expressed as follows. The following Equation (5) is premised on the assumption that only ACK/NACK is mapped to the RB allocated for ACK/NACK transmission. That is, for ease of description, no consideration is given to the case where other control information, such as CQI or MIMO feedback-related control information, is multiplexed with ACK/NACK in the same RB.

$$CCE(k) \rightarrow OS(m), CS(m,n), RB(o),$$
$$k=0,1,\ldots,N_{CCE}-1$$
$$m=\text{floor}(k/N_{CS}) \bmod N_{OS}(m=0,1,\ldots,N_{OS}-1)$$
$$n=k \bmod N_{CS}(n=0,1,\ldots,N_{CS}-1)$$
$$o=\text{floor}(k/(N_{OS}*N_{CS}))(o=0,1,\ldots,N_{RB}-1) \quad (5)$$

In the above Equation (5), 'x mod y' indicates a remainder obtained by dividing x by y, and floor(z) is the greatest integer not greater than z.

For ease of description, if it is assumed in FIG. 10A and FIG. 10B that $N_{RB}=1$, $N_{CS}=4$, and $N_{OS}=3$, CCE(k) is one-to-one mapped to resources OS(m) CS(n) and RB(o) for ACK/NACK transmission, as follows.

CCE(0)→OS(0), CS(0, 0), RB(0),
CCE(1)→OS(0), CS(0, 1), RB(0),
CCE(2)→OS(0), CS(0, 2), RB(0),
CCE(3)→OS(0), CS(0, 3), RB(0),
CCE(4)→OS(1), CS(1, 0), RB(0),
CCE(5)→OS(1), CS(1, 1), RB(0),
CCE(6)→OS(1), CS(1, 2), RB(0),
CCE(7)→OS(1), CS(1, 3), RB(0),
CCE(8)→OS(2), CS(2, 0), RB(0),
CCE(9)→OS(2), CS(2, 1), RB(0),
CCE(10)→OS(2), CS(2, 2), RB(0),
CCE(11)→OS(2), CS(2, 3), RB(0),

When multiple CCEs constitute a downlink control channel, the CCEs can be consecutive, or can be scattered, i.e., inconsecutive, and this depends on the system operation. FIG. 10A illustrates the former case, while FIG. 10B illustrates the latter case.

FIG. 10A illustrates an example in which CCE(0), CCE(1), CCE(2), and CCE(3) constitute a downlink control channel including scheduling control information for UE #1; CCE(4) and CCE(5) constitute a downlink control channel including scheduling control information for UE #2; CCE(6) and CCE (7) constitute a downlink control channel including scheduling control information for UE #3; CCE(8) and CCE(9) constitute a downlink control channel including scheduling control information for UE #4; and CCE(10) and CCE(11) constitute a downlink control channel including scheduling control information for UE #5.

Because a UE only needs to transmit one ACK/NACK in response to the data channel and downlink control channel transmitted by a base station, the UE selects one of the resources for UE ACK/NACK transmission, mapped to multiple CCEs constituting the downlink control channel for each UE, and performs ACK/NACK transmission with the selected resources. The method of selecting resources for UE ACK/NACK transmission can be recognized in common by the base station and the UE under an agreement previously made therebetween. As a possible example, there is a method for setting ACK/NACK resources mapped to a CCE having the minimum index among the CCEs constituting a downlink control channel for the UE, as resources that the UE actually uses for ACK/NACK transmission. Therefore, in the example illustrated in FIG. 10A, UE #1 transmits ACK/NACK using ACK/NACK resources OS(0), CS(0,0), and RB(0) mapped to CCE(0); UE #2 transmits ACK/NACK using ACK/NACK resources OS(1), CS(1,0), and RB(0) mapped to CCE(4); UE #3 transmits ACK/NACK using ACK/NACK resources OS(1), CS(1,2), and RB(0) mapped to CCE(6); UE #4 transmits ACK/NACK using ACK/NACK resources OS(2), CS(2, 0), and RB(0) mapped to CCE(8); and UE #5 transmits ACK/NACK using ACK/NACK resources OS(2), CS(2,2), and RB(0) mapped to CCE(10).

FIG. 10B illustrates an example in which CCE(0), CCE(5), CCE(10), and CCE(11) constitute a downlink control channel including scheduling control information for UE #1; CCE(1) and CCE(6) constitute a downlink control channel including scheduling control information for UE #2; CCE(2) and CCE (7) constitute a downlink control channel including scheduling control information for UE #3; CCE(3) and CCE(8) constitute a downlink control channel including scheduling control information for UE #4; and CCE(4) and CCE(9) constitute a downlink control channel including scheduling control information for UE #5.

There is a method for setting ACK/NACK resources mapped to a CCE having the minimum index among the CCEs constituting a downlink control channel for the UE, as resources that the UE actually uses for ACK/NACK transmission. In this case, in the example illustrated in FIG. 10B, UE #1 transmits ACK/NACK using ACK/NACK resources OS(0), CS(0,0), and RB(0) mapped to CCE(0); UE #2 transmits ACK/NACK using ACK/NACK resources OS(0), CS(0, 1), RB(0) mapped to CCE(1); UE #3 transmits ACK/NACK using ACK/NACK resources OS(0), CS(0, 2), and RB(0) mapped to CCE(2); UE #4 transmits ACK/NACK using ACK/NACK resources OS(0), CS(0,3), and RB(0) mapped CCE(3); and UE #5 transmits ACK/NACK using ACK/NACK resources OS(1), CS(1,0), and RB(0) mapped to CCE (4).

Embodiment 4

Embodiment 4 provides an operation in which one of Embodiment 1, Embodiment 2, and Embodiment 3 is selectively applied for allocation of resources for UE ACK/NACK transmission, and its relevant signaling information.

A base station transmits the following control information to UEs in order to efficiently manage the resources for UE ACK/NACK transmission.

(1) First Control Information

First control information indicates a mapping rule between downlink control channels and resources for UE ACK/NACK transmission. Specifically, first control information indicates one of the mapping rule of Embodiment 1, the mapping rule of Embodiment 2, the mapping rule of Embodiment 3, and the mapping rule of Embodiment 3a. Otherwise, first control information indicates one of 2 arbitrary mapping rules among the 4 mapping rules by limiting the number of mapping rules that the system intends to apply. For example, first control information indicates one of the mapping rule of Embodiment 1 and the mapping rule of Embodiment 2. In this case, 1 bit is needed for First Control Information signaling.

(2) Second Control Information

Second control information indicates a cyclic shift offset value of a Zadoff-Chu sequence. The cyclic shift offset value indicates the number of samples, at intervals of which the Zadoff-Chu sequence is cyclic-shifted. Because the maximum delay spread is different according to the channel environment, the base station adaptively sets the cyclic shift offset value according to the channel environment so that orthogonality between the cyclic-shifted Zadoff-Chu sequences can be guaranteed.

(3) Third Control Information

Third control information indicates the number of ACK/NACK signals mapped to each of RBs for a PUCCH, allocated at both ends of the system transmission bandwidth. Because the ACK/NACK and also CQI information indicating the channel state and MIMO-related feedback information can be mapped to the PUCCH, the third control information indicates the number of ACK/NACK signals mapped to the RB for PUCCH.

(4) Fourth Control Information

Fourth control information indicates the position of a start RB to which an ACK/NACK signal is mapped, among the RBs for a PUCCH, allocated at both ends of the system transmission bandwidth. Because the position of an RB, to which an ACK/NACK signal is mapped, among the RBs for a PUCCH, can be different according to the amount of CQI information and/or MIMO-related feedback information being mapped thereto, the fourth control information indicates the position of a start RB to which an ACK/NACK signal is mapped. The signals mapped to RBs situated at both very ends of the system transmission bandwidth often suffer performance degradation caused by interference from other systems. Generally, in terms of the required reception reliability, the ACK/NACK signal is higher than the CQI and/or MIMO-related feedback information. Therefore, when the ACK/NACK, CQI information and MIMO-related feedback information are multiplexed using multiple RBs, it is preferable, for efficient system operation, to map the CQI information and/or MIMO-related feedback information to RBs for a PUCCH, allocated at both ends of the system transmission bandwidth, and map ACK/NACK to the RBs for a PUCCH, the mapping of the CQI information and/or MIMO-related feedback information to which is completed, or to their succeeding RBs for a PUCCH. The application of such an operation protects ACK/NACK from interference from adjacent system bands, and when the RBs for a PUCCH, allocated for ACK/NACK transmission, are unused for ACK/NACK transmission, uses the unused RBs for data transmission.

(5) Fifth Control Information

Fifth control information indicates cyclic shift values of the Zadoff-Chu sequence, used for RBs to which ACK/NACK is mapped, among the RBs for a PUCCH, allocated at both ends of the system transmission bandwidth. The multiplexing based on cyclic shifts of the Zadoff-Chu sequence is applied not only to the ACK/NACK but also to the CQI information and/or MIMO-related feedback information. Therefore, in multiplexing ACK/NACK with CQI information and/or MIMO-related feedback information in the same RB, it is necessary to notify the cyclic shift values of the Zadoff-Chu sequence, used for ACK/NACK transmission. When the cyclic shift values of the Zadoff-Chu sequence, used for ACK/NACK transmission, are consecutively disposed at intervals of a cyclic shift offset value, the fifth control information indicates the minimum value or start value of the cyclic shift value of the Zadoff-Chu sequence, used for ACK/NACK transmission.

The foregoing control information may be provided to the UEs through a Broadcast Channel (BCH) transmitted by the base station, or through separate control channels or upper layer signaling.

Figure 11:
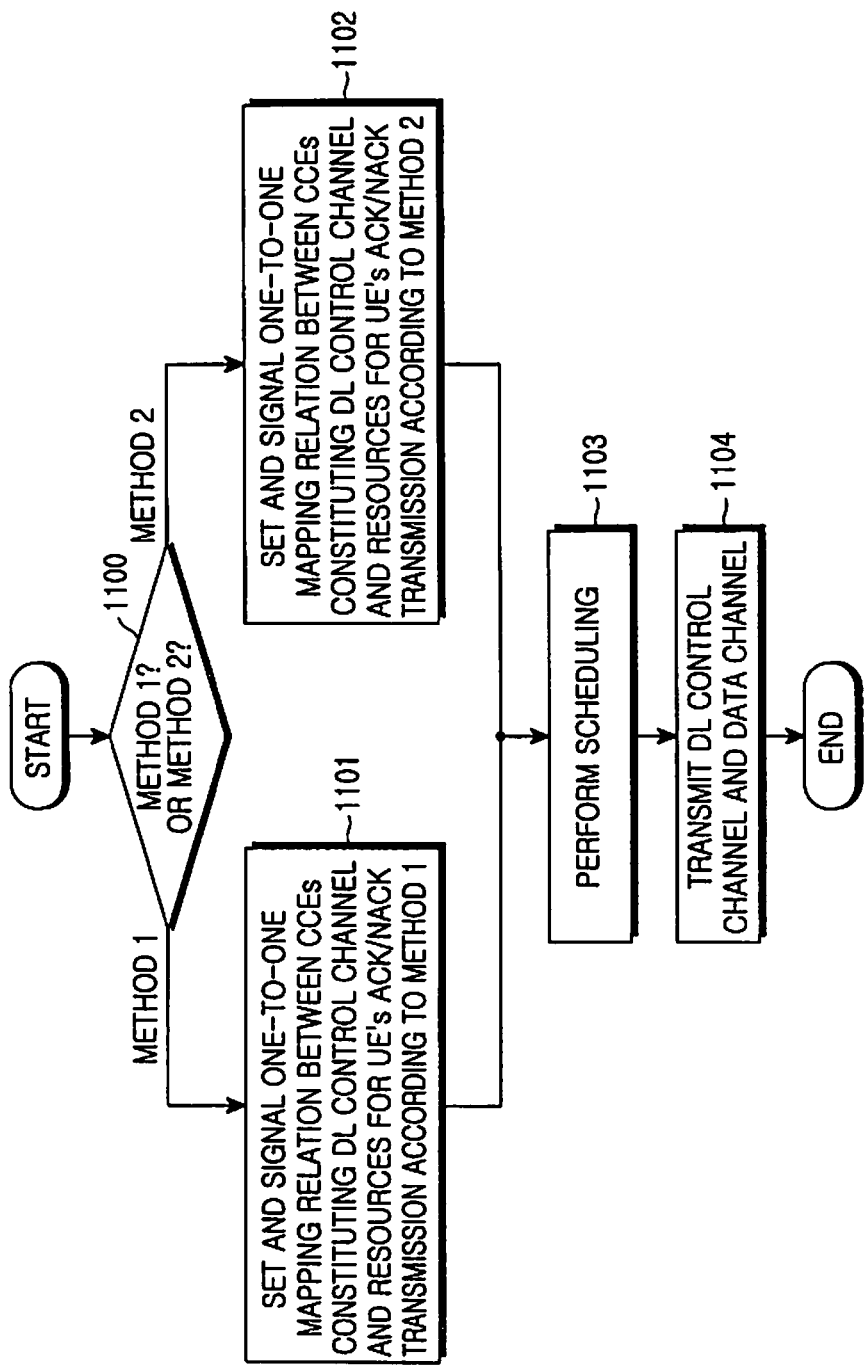
FIG. 11 is a diagram illustrating an operating procedure of a base station according to Embodiment 4 of the present invention.

FIG. 11 illustrates a procedure in which a base station provides a UE with information on resources for ACK/NACK transmission to perform the foregoing operation.

Referring to FIG. 11, in step 1100, a base station selects one of Method 1 and Method 2 as a method by which a UE acquires a one-to-one mapping relation between CCEs constituting a downlink control channel and resources for UE ACK/NACK transmission and also acquires the resources for ACK/NACK transmission. For ease of description, Method 1 indicates the method of Embodiment 1, Method 2 indicates the method of Embodiment 2. The selection is made taking into account the reception performance of an ACK/NACK and the efficiency of the ACK/NACK resources. In other cases, Method 1 and Method 2 can be two arbitrary methods among the methods of Embodiment 1, Embodiment 2, Embodiment 3, and Embodiment 3a. For example, Method 1 and Method 2 can be the methods of Embodiment 1 and Embodiment 3, or the methods of Embodiment 2 and Embodiment 3.

If Method 1 is selected, the base station sets in step 1101a method according to Method 1, by which the UE acquires a one-to-one mapping relation between CCEs constituting a downlink control channel and resources for UE ACK/NACK transmission and also acquires the resources for ACK/NACK transmission, and then provides the corresponding information to the UE. Further, the base station provides control information including the first control information, second control information, third control information, fourth control information, and fifth control information, to the UE through signaling. The resources for UE ACK/NACK transmission include RB information, which is frequency-domain resource information, cyclic shift information of the Zadoff-Chu sequence, and orthogonal sequence information.

However, if Method 2 is selected, the base station sets in step 1102 a method according to Method 2, by which the UE acquires a one-to-one mapping relation between CCEs constituting a downlink control channel and resources for UE ACK/NACK transmission and also acquires the resources for ACK/NACK transmission, and then provides the corresponding information to the UE. Further, the base station provides control information including the first control information, second control information, third control information, fourth control information, and fifth control information, to the UE through signaling. The resources for UE ACK/NACK transmission include RB information, which is frequency-domain resource information, cyclic shift information of the Zadoff-Chu sequence, and orthogonal sequence information.

In step 1103, the base station determines whether to transmit a downlink data channel through a predetermined scheduling operation. When the base station determines to transmit the downlink data channel, it determines resources for downlink data channel transmission and its transmission format.

In step 1104, the base station transmits the downlink data channel according to the resources for downlink data channel transmission and the transmission format, determined in step 1103. In addition, the base station transmits a downlink control channel including the resources for downlink data channel transmission and the transmission format. Then the UE acquires from the received downlink control channel the resources for UE ACK/NACK transmission according to the information signaled in step 1101 or 1102 from the base station.

For the procedure in which the UE acquires resources for ACK/NACK transmission from the base station and transmits ACK/NACK with the acquired resources, reference can be made to FIG. 7.

Figure 12:
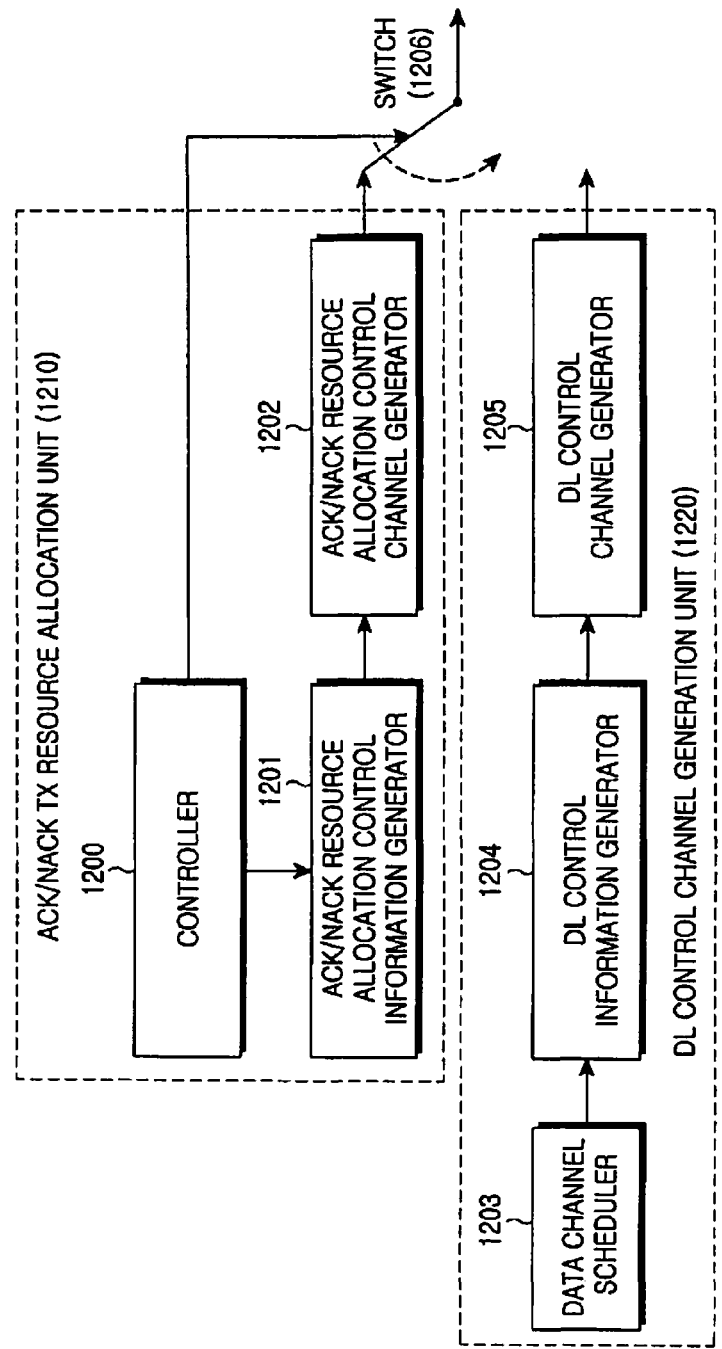
FIG. 12 is a block diagram illustrating a base station apparatus according to a preferred embodiment of the present invention.

FIG. 12 is a block diagram illustrating a base station apparatus according to a preferred embodiment of the present invention. For ease of description, a description of a data channel generation device will be omitted herein.

Referring to FIG. 12, the base station apparatus proposed by the present invention includes an ACK/NACK resource allocation unit 1210 for generating and transmitting control information used for pre-allocating resources to the UE, and a downlink control channel generation unit 1220 for generating and transmitting a data channel and its associated downlink control channel.

Specifically, the ACK/NACK resource allocation unit 1210 includes a controller 1200, an ACK/NACK resource allocation control information generator 1201, and an ACK/NACK resource allocation control channel generator 1202, and the downlink control channel generation unit 1220 includes a data channel scheduler 1203, a downlink control information generator 1204, and a downlink control channel generator 1205.

The base station controller 1200 determines a method by which a UE acquires a one-to-one mapping relation between CCEs constituting a downlink control channel and resources for UE ACK/NACK transmission and also acquires the resources for ACK/NACK transmission, and provides the relevant information to the ACK/NACK resource allocation control information generator 1201.

The ACK/NACK resource allocation control information generator 1201 generates control information including input information from the controller 1200 and the above-stated first control information, second control information, third control information, fourth control information, and fifth control information, and provides the generated control information to the ACK/NACK resource allocation control channel generator 1202. The ACK/NACK resource allocation control channel generator 1202 generates a signal by performing a predetermined channel coding and modulation process on the input signal, and transmits the generated signal to the UE. The ACK/NACK resource allocation control channel can be either a separate physical layer control channel or a broadcast channel.

A transmission time of the ACK/NACK resource allocation control channel is adjusted by the base station controller 1200, and is shown as a switch 1206 in FIG. 12. After the ACK/NACK resource allocation control channel is transmitted, the data channel scheduler 1203 performs a scheduling operation on the data channel it will transmit to the UE. The downlink control information generator 1204 generates downlink control information by acquiring, from the data channel scheduler 1203, information such as resources over which a data channel is transmitted, and/or a transmission format of the data channel. The downlink control channel generator 1205 generates a signal by performing a predetermined channel coding and modulation process on the generated downlink control information, and transmits the generated signal to the UE. A transmission time of the downlink control channel is determined by an operation of the switch 1206 controlled by the base station controller 1200.

Figure 13:
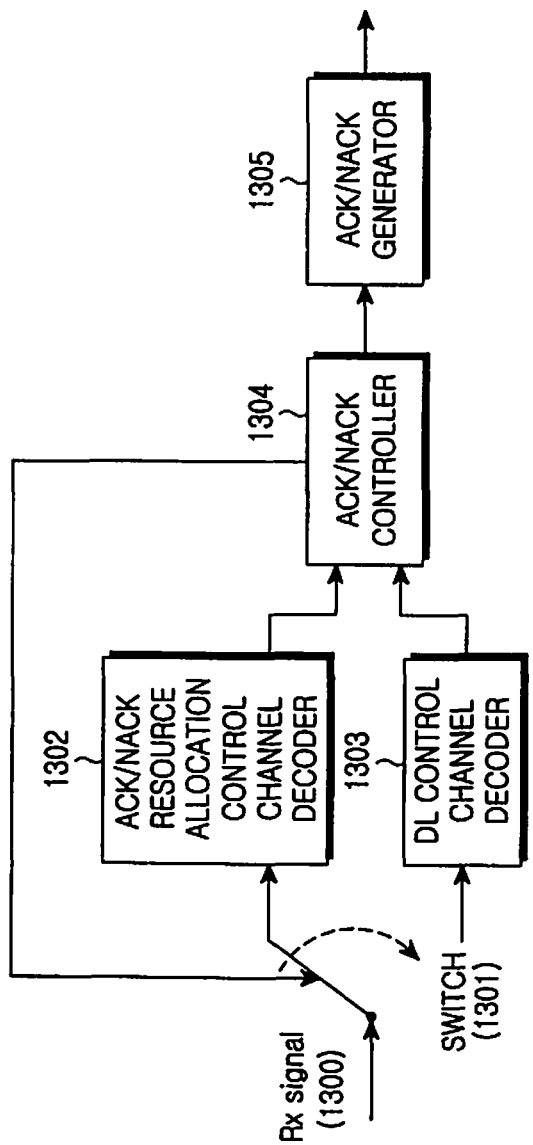
FIG. 13 is a block diagram illustrating a UE apparatus for transmitting ACK/NACK according to a preferred embodiment of the present invention.

FIG. 13 is a block diagram illustrating a UE apparatus for transmitting ACK/NACK according to a preferred embodiment of the present invention. For ease of description, a description of data channel reception device will be omitted herein.

A UE extracts an ACK/NACK resource allocation control channel transmitted by the base station from a received signal 1300, performs a decoding operation thereon through an ACK/NACK resource allocation control channel decoder 1302 to thereby acquire control information including a method by which the UE acquires a one-to-one mapping relation between CCEs constituting a downlink control channel and resources for UE ACK/NACK transmission. Further, the UE acquires the resources for ACK/NACK transmission, and also including the above-stated first control information, second control information, third control information, fourth control information, and fifth control information, and provides the acquired control information to an ACK/NACK controller 1304. The ACK/NACK controller 1304 extracts the ACK/NACK resource allocation control channel transmitted by the base station by controlling a switch 1301 based on predetermined reception time and resource information.

After acquiring ACK/NACK-related control information from the ACK/NACK resource allocation control channel, the UE receives a downlink control channel and performs a decoding operation thereon using a downlink control channel decoder 1303. The ACK/NACK controller 1304 determines which CCEs constitute the downlink control channel, from the decoding result on the downlink control channel, and determines resources for ACK/NACK transmission using the information acquired from the ACK/NACK resource allocation control channel decoder 1302. An ACK/NACK generator 1305 determines the presence/absence of an error in the received data, generates ACK/NACK according to the decision on the presence/absence of an error, maps the generated ACK/NACK to the determined resources for ACK/NACK transmission, and transmits the result to the base station.

As is apparent from the foregoing description, the application of the operations proposed by the present invention minimizes the overhead required for signaling resource allocation information for ACK/NACK transmission to the UE and optimizes an amount of resources required for ACK/NACK transmission in the mobile communication system supporting a packet data service to which HARQ is applied, thereby improving the ACK/NACK reception performance.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A method for receiving Acknowledgement (ACK)/negative ACK (NACK) information by a base station in a mobile communication system, the method comprising:
   transmitting data and control information to at least one user equipment (UE), the control information being transmitted on a downlink control channel including at least one control channel element (CCE);
   checking a resource for reception of an ACK/NACK mapped to the at least one CCE based on a mapping rule between CCEs and resources for reception of the ACK/NACK, the resource for reception of the ACK/NACK identified by a cyclic shift index, an orthogonal sequence index, and a resource block index; and
   receiving the ACK/NACK information for the transmitted data using the checked resource,
   wherein the mapping rule is that as an index corresponding to a CCE sequentially increases, the cyclic shift index increases until exhausted and then resets, the orthogonal sequence index increases each time the cyclic shift index is exhausted, until exhausted, and then resets, and the resource block index of resources for reception of the ACK/NACK increases each time the orthogonal sequence index is exhausted.

2. The method of claim 1, wherein the at least one CCE is a first CCE of the downlink control channel.

3. The method of claim 1, further comprising transmitting a cyclic shift offset value that indicates a number of sample intervals of which a sequence is cyclically shifted.

4. A method for transmitting Acknowledgement (ACK)/negative ACK (NACK) information by a user equipment (UE) in a mobile communication system, the method comprising:
   receiving data and control information from a base station, the control information being received on a downlink control channel including at least one control channel element (CCE);

acquiring a resource for transmission of an ACK/NACK mapped to the at least one CCE based on a mapping rule between CCEs and resources for transmission of the ACK/NACK, the resource for transmission of the ACK/NACK identified by a cyclic shift index, an orthogonal sequence index, and a resource block index; and transmitting the ACK/NACK information for the received data using the acquired resource, wherein the mapping rule is that as an index corresponding to a CCE sequentially increases, the cyclic shift index increases until exhausted and then resets, the orthogonal sequence index increases each time the cyclic shift index is exhausted, until exhausted, and then resets, and the resource block index of resources for reception of the ACK/NACK increases each time the orthogonal sequence index is exhausted.

5. The method of claim 4, wherein the at least one CCE is a first CCE of the downlink control channel.

6. The method of claim 4, further comprising:

receiving a cyclic shift offset value that indicates a number of sample intervals of which a sequence is cyclically shifted; and acquiring the number of sample intervals of which the sequence is cyclically shifted.

7. A base station for receiving Acknowledgement (ACK)/negative ACK (HACK) information in a mobile communication system, the base station apparatus-comprising:

a transmitter for transmitting data and control information to at least one user equipment (UE), the control information being transmitted on a downlink control channel including at least one control channel element (CCE);

a controller for checking a resource for reception of an ACK/NACK mapped to the at least one CCE based on a mapping rule between CCEs and resources for reception of the ACK/NACK, the resource for reception of the ACK/NACK identified by a cyclic shift index, an orthogonal sequence index, and a resource block index; and a receiver for receiving the ACK/NACK information for the transmitted data using the checked resource, wherein the mapping rule is that as an index corresponding to a CCE sequentially increases, the cyclic shift index increases until exhausted and then resets, the orthogonal sequence index increases each time the cyclic shift index is exhausted, until exhausted, and then resets, and the resource block index of resources for reception of the ACK/NACK increases each time the orthogonal sequence index is exhausted.

8. The base station of claim 7, wherein the at least one CCE is a first CCE of the downlink control channel.

9. The base station of claim 7, wherein the transmitter transmits a cyclic shift offset value that indicates a number of sample intervals of which a sequence is cyclically shifted.

10. A user equipment (UE) for transmitting Acknowledgement (ACK)/negative ACK (HACK) information in a mobile communication system, the UE comprising:

a receiver for receiving data and control information from a base station, the control information being received on a downlink control channel including at least one control channel element (CCE);

a controller for acquiring a resource for transmission of an ACK/NACK mapped to at least one CCE based on a mapping rule between CCEs and resources for transmission of the ACK/NACK, the resource for transmission of the ACK/NACK identified by a cyclic shift index, an orthogonal sequence index, and a resource block index; and a transmitter for transmitting the ACK/NACK information for the received data using the acquired resource, wherein the mapping rule is that as an index corresponding to a CCE sequentially increases, the cyclic shift index increases until exhausted and then resets, the orthogonal sequence index increases each time the cyclic shift index is exhausted, until exhausted, and then resets, and the resource block index of resources for reception of the ACK/NACK increases each time the orthogonal sequence index is exhausted.

11. The UE of claim 10, wherein the at least one CCE is a first CCE of the downlink control channel.

12. The UE of claim 10, wherein the receiver receives a cyclic shift offset value that indicates a number of sample intervals of which a sequence is cyclically shifted, and the controller acquires the number of sample intervals of which the sequence is cyclically shifted.

* * * * *